(12) United States Patent
Takla et al.

(10) Patent No.: US 12,120,717 B2
(45) Date of Patent: Oct. 15, 2024

(54) SYSTEMS AND METHODS FOR SIMULATING FAST FADING IN A WIRED TELECOMMUNICATIONS NETWORK

(71) Applicant: Verizon Patent and Licensing Inc., Basking Ridge, NJ (US)

(72) Inventors: Mourad B. Takla, Hillsborough, NJ (US); Matthijs Andries Visser, Randolph, NJ (US); Xiong Yang, Berkeley Heights, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 402 days.

(21) Appl. No.: 17/578,580

(22) Filed: Jan. 19, 2022

(65) Prior Publication Data
US 2023/0232438 A1    Jul. 20, 2023

(51) Int. Cl.
| | | |
|---|---|---|
| *H04B 17/345* | (2015.01) | |
| *H04B 17/382* | (2015.01) | |
| *H04B 17/391* | (2015.01) | |
| *H04W 72/04* | (2023.01) | |
| *H04W 72/23* | (2023.01) | |
| *H04W 72/541* | (2023.01) | |

(52) U.S. Cl.
CPC ........ *H04W 72/541* (2023.01); *H04B 17/345* (2015.01); *H04B 17/382* (2015.01); *H04B 17/3912* (2015.01); *H04W 72/23* (2023.01)

(58) Field of Classification Search
CPC .............. H04B 17/345; H04B 17/382; H04B 17/3912; H04W 72/23; H04W 72/541; H04W 72/27
See application file for complete search history.

(56) References Cited

U.S. PATENT DOCUMENTS

2010/0034151 A1* 2/2010 Alexiou ................. H04B 7/022
370/329

* cited by examiner

*Primary Examiner* — Melvin C Marcelo
*Assistant Examiner* — Natali Pascual Peguero

(57) ABSTRACT

One or more computing devices, systems, and/or methods are provided. A system includes a first user equipment (UE) module and a second UE module, a first base station (BS) module associated with the first UE module, and a second BS module associated with the second UE module. The first BS module is configured to send a first resource allocation map associated with the first UE module to the second BS module and at least one of the second UE module or the second BS module is configured to access a first fast fading table to determine a first fast fading parameter for the second UE module, generate a first interference metric based on the first resource allocation map and the first fast fading parameter, and modulate a data transmission between the second UE module and the second BS module based on the first interference metric.

21 Claims, 11 Drawing Sheets

| | 0 | 1 | 2 | ... | N-1 |
|---|---|---|---|---|---|
| RB M-1 | γ(M-1,t0) | γ(M-1,t1) | γ(M-1,t2) | ... | γ(M-1,tN-1) |
| ... | ... | ... | ... | ... | ... |
| RB 1 | γ(1,t0) | γ(1,t1) | γ(1,t2) | ... | γ(1,tN-1) |
| RB 0 | γ(0,t0) | γ(0,t1) | γ(0,t2) | ... | γ(0,tN-1) |

154

FREQUENCY (PRB) / TIME

Fig. 1E

SYSTEMS AND METHODS FOR SIMULATING FAST FADING IN A WIRED TELECOMMUNICATIONS NETWORK

BACKGROUND

A wireless telecommunication network provides various telecommunication services such as telephony, video, data, messaging, and/or broadcasts. The wireless telecommunication network may include a number of base stations (e.g., a Node B, a gNB, an access point (AP), a radio head, a transmit receive point (TRP), a New Radio (NR) BS, a 5G Node B, and/or the like) that can support communication for a number of user equipment (UEs). A user equipment (UE) may communicate with a base station via a downlink and an uplink. The downlink (or forward link) refers to the communication link from the base station to the UE, and the uplink (or reverse link) refers to the communication link from the UE to the base station.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIGS. 1A-1E are diagrams of one or more example implementations 100, according to some embodiments.

DETAILED DESCRIPTION OF EXAMPLE EMBODIMENTS

Figure 1A:
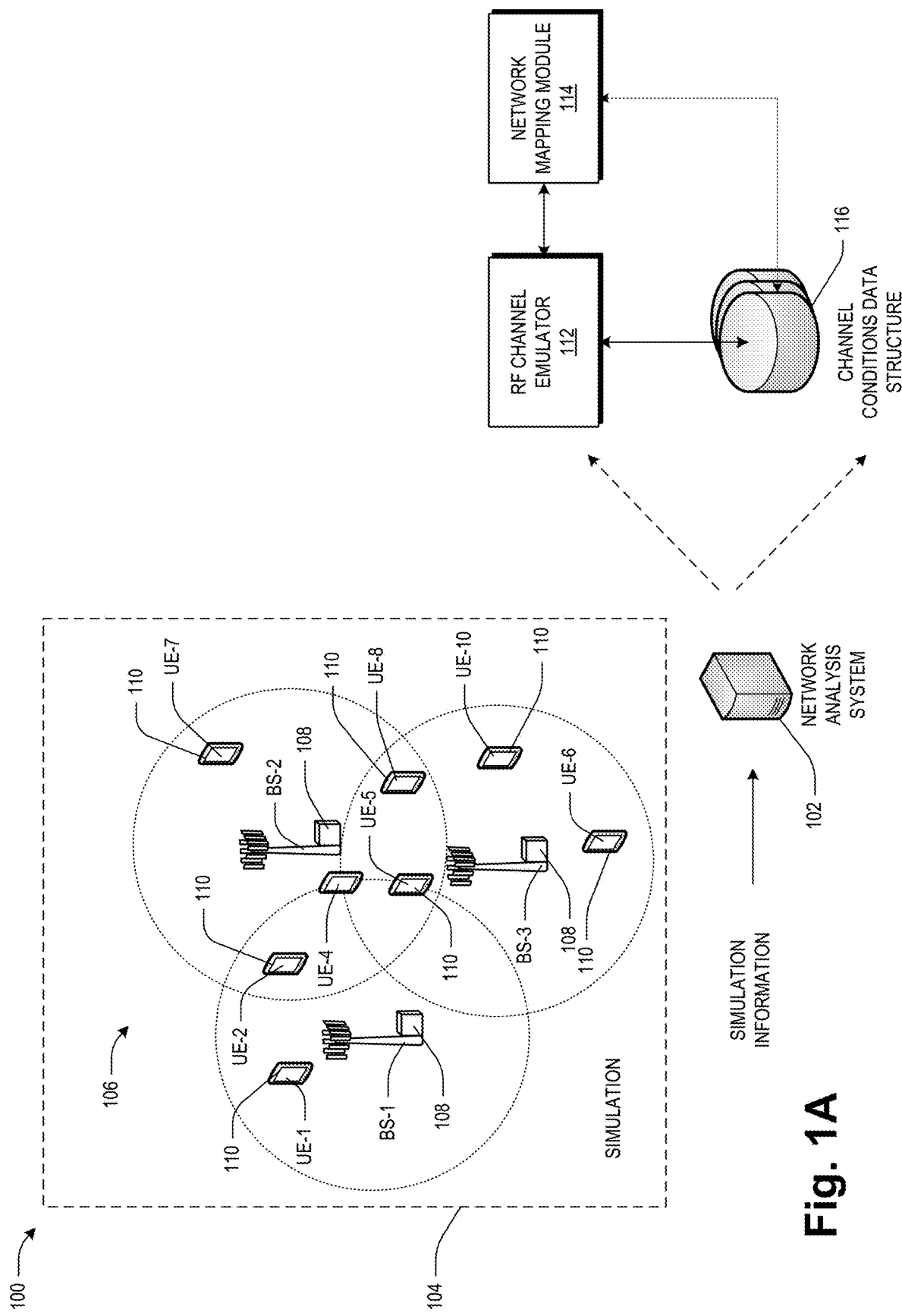

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

In some instances, an operator may determine to modify a wireless telecommunication network. For example, an operator may determine that a new base station is to be installed to enable the wireless telecommunication network to accommodate additional user equipment (UE), that the wireless telecommunication network is to be reconfigured to increase a quality of service associated with the wireless telecommunication network, that a site within the wireless telecommunication is to be decommissioned, and/or other modifications.

Prior to modifying the wireless telecommunication network, the operator may run a simulation to determine the effect of the modification on the wireless telecommunication network. For example, the operator may run a simulation to determine an increase in a quantity of UEs that can be accommodated by the wireless telecommunication network that may result from installing the new base station, whether a change to the configuration of the wireless telecommunication network will improve the quality of service associated with the wireless telecommunication network, and/or other effects of the modification.

To run the simulation, the user may utilize individual hardware components to simulate the devices (e.g., the UEs, the base stations, and/or other network components) included in the wireless telecommunications network. The hardware components may communicate via wireless communication. To prevent unwanted signals from interfering with the simulation, the hardware components may be placed in a dedicated, shielded room. The use of a dedicated, shielded room increases a complexity and/or a cost with running the simulation. Further, the number of components that can be included in the simulation may be limited by a size of the room.

Alternatively, the user may utilize a software-based system to perform the simulation. The software-based system may utilize software components to simulate the devices included in the wireless telecommunications network. The use of the software components may eliminate the need to perform the simulation in a dedicated, shielded room. However, the software system may be limited to simulations including a single UE and a single base station. Further, the time required to execute the simulation may be greatly increased relative to utilizing individual hardware components to simulate the devices.

Some implementations described herein enable a network analysis system to simulate a performance of a wireless telecommunications network. For example, the network analysis system may obtain simulation data indicating various characteristics of the wireless telecommunications network and may utilize a combination of hardware and software to generate a simulated environment corresponding to the wireless telecommunications network based on the simulation data. The simulated environment may include a plurality of physical and/or virtual base stations and virtual and/or physical UEs instantiated on physical computing devices connected via a physical network, such as an Ethernet network. Utilizing the virtual and/or physical base stations and virtual and/or physical UEs enables the wireless telecommunications network to generate a simulated environment that includes tens, hundreds, thousands, or more base stations and/or UEs utilizing fewer physical resources relative to other systems.

A physical layer of the devices transmits data between a UE and a base station via the physical network. When the data is transmitted, the network analysis system may determine a location of the UE based on the simulation data. The network analysis system may obtain channel condition information associated with the location of the UE from a data structure storing channel condition information for a plurality of locations within a geographical area associated with the wireless telecommunications network. The channel condition information for a location may include information indicating RF characteristics associated with a signal transmitted between the UE and the base station while the UE is located at the location.

The channel condition information may be determined and stored in the data structure prior to the network analysis system simulating the performance of the wireless telecommunications network. For example, the network analysis system may obtain actual channel condition information associated with locations within a coverage area of the wireless telecommunications network, the network analysis system may utilize machine learning to determine the channel condition information, and/or the like. In this way, the network analysis system may conserve time and computing resources (e.g., processing resources, memory resources, communication resources, and/or the like). The conservation of time and computing resources enables the network analysis system to simulate a performance of a larger wireless telecommunications network (e.g., a greater quantity of base stations, a greater quantity of UEs operating within the wireless communications network, and/or the like) relative to a system that determines the channel condition information during the simulation of the wireless telecommunications network.

In some embodiments, the network analysis system applies channel conditions to the data and inserts the channel condition information into the transmitted data. By inserting channel conditions into traffic between the UE and the base station, the network analysis system may be more flexible and/or may more accurately reflect real life scenarios relative to other systems for simulating wireless communications. Further, by applying the channel conditions to the data, the network analysis system simulates the transmission of the data via a wireless telecommunications network without requiring a dedicated, shielded room.

In one example simulation scenario, a first UE located near an edge of a coverage area served by a first base station is susceptible to downlink and/or uplink interference from signals communicated between a second UE and a second base station serving the second UE. In some instances the first base station assigns one or more physical resource blocks (PRBs) to the first UE that are the same as those assigned by the second base station for communicating with the second UE. The uplink or downlink signals associated with the second base station and the second UE result in interference for the first UE. To accurately simulate an environment with multiple base stations with downlink and uplink interference, the PRBs assigned to various UE are communicated so that each UE can estimate its channel conditions, including interference. This information is communicated with the wired simulation environment without degrading the real time aspect of the simulation by sending the interference information only to those entities that use the data to estimate interference. Using targeted message as opposed to broadcast messages reduces message traffic and improves performance of the simulation environment.

One factor that affects interference is fast fading. Fast fading refers to constructive and destructive interference patterns that affect communicated downlink or uplink signals. Fast fading effects may include real and/or complex components, thereby affecting the communicated signals in both the time domain and the frequency domain. In some embodiments, fast fading is simulated using a lookup table that specifies fast fading parameters as a function of time and frequency. In some embodiments, a channel model is employed to populate the fast fading lookup table. Different UEs in the simulation may use different channel models. For example, one channel model may represent a UE associated with a user traveling in a vehicle at a particular speed in a rural environment, while another channel model may represent a UE associated with a user walking in an urban environment. The fast fading parameters for successive time intervals in the simulation depend on the speed of the UE.

In some embodiments, for a downlink simulation, the base stations exchange downlink resource allocation maps (DL_RAM) with neighboring base stations. The DL-RAM for a given base station lists the PRBs allocated to UE served by the given base station. Each base station sends a downlink control information (DCI) message indicating transmission time interval (TTI) PRB allocations its served UE. Each base station also sends the DL-RAM of neighboring base stations to each served UE. In some embodiments, the UE identifies the DL-RAMs (of the base stations causing interference to its signal and) that include PRBs that overlap its assigned PRBs in the DCI and determines interference using the identified DL-RAMs. The UE ignores DL-RAMs without overlapping PRBs. For example, if a first base station assigns PRBs 1-5 to a first UE in the DCI, and a second base station assigns one or more of PRBs 1-5 to one or more of its served UE in its DCI, the first UE uses the DL-RAM for the second base station to calculate interference. This approach reduces message traffic in that the DL-RAM information is distributed by the base stations to their served UE such that each UE only receives overhead messages from a single serving base station and the amount of overhead messages is constant regardless of the number of UE being affected by other base stations. When calculating interference in a downlink simulation each UE employs a fast fading table to determine fast fading parameters that are applied to interfering signals from neighboring base stations.

In some embodiments, the DL-RAM for a neighboring base station is only sent to the UE if overlapping PRBs are used by the neighboring base station. For example, the first base station knows the PRBs assigned to the first UE in the DCI. If a third base station does not assign PRBs 1-5 to any of its served UE, the DL-RAM for the third base station is not sent by the first base station to the first UE. This approach further reduces message traffic in that each UE only receives the DL-RAMs for the base stations that can cause interference.

In some embodiments, for an uplink simulation, each base station generates an uplink resource allocation map and, in addition, the base station includes a list of transmitting UEs for a given transmission time interval (TTI), an uplink resource allocation map (UL_UERAM) for each TTI, and radio frequency (RF) condition data for each scheduled UE in the given TTI. Each base station shares its upload map for scheduled UE with neighboring base stations. Each base station uses the uplink maps and the RF conditions for the scheduled UEs from neighboring base stations to calculate interference. In some embodiments, each base station stores a library of fast fading tables used in the simulation. The UL_UERAM includes an identifier designating the particular fast fading table used by each UE and the default speed of the UE, thereby allowing the base station to determine fast fading parameters for each interfering UE without requiring overhead messages from the UE specifying fast fading parameters.

To facilitate multiple UEs using the same fast fading lookup table, each UE randomly selects a starting point along the time dimension, thereby avoiding multiple UE having the same series of fast fading parameters. The random starting point may be different for UL and DL communications. The random starting point used by a UE may also vary for each base station. A fast fading lookup table has a finite number of entries. When the end of the table is reached in the time dimension, a wrap-around technique is used to determine the fast fading parameter for the next time interval. To facilitate a greater degree of randomness, an adjustment factor is employed with each wrap-around to prevent repetitions in the series of fast fading parameters as the simulation progresses.

In some embodiments, the channel model used to populate a fast fading table employs a predetermined speed parameter and/or a predetermined simulation frequency (time between samples). In the simulation, a particular UE may have a simulated speed that differs from the predetermined speed used by the channel model. The update frequency used in the simulation may also differ from the frequency used to generate the fast fading table. To account for speed variations, a ratio between the simulated speed and the predetermined speed and/or a ratio between the simulation frequency and the table simulation frequency may be employed to generate adjust the index used to access the fast fading lookup table. For example, a UE simulated moving at twice the predetermined speed assumed by the channel model will increment the time dimension at two times the nominal rate, thereby skipping every other entry in the fast fading table.

Embodiments described herein also include a system comprising a first user equipment (UE) module and a second UE module connected to a wired network, a first base station (BS) module associated with the first UE module and coupled to the wired network, and a second BS module associated with the second UE module and coupled to the wired network. The first BS module is configured to send a first resource allocation map associated with the first UE module to the second BS module and at least one of the second UE module or the second BS module is configured to access a first fast fading table to determine a first fast fading parameter for the second UE module, generate a first interference metric based on the first resource allocation map and the first fast fading parameter, and modulate a data transmission between the second UE module and the second BS module based on the first interference metric.

In a further aspect of the system, the data transmission comprises a downlink data transmission from the second BS module to the second UE module, the second BS module is configured to send the first resource allocation map to the second UE module, and the second UE module is configured to generate the first interference metric based on the first fast fading parameter.

Further aspects of the system comprise a third UE module connected to the wired network, and a third BS module associated with the third UE module and connected to the wired network. The third BS module is configured to send a second resource allocation map to the second BS module, and the second UE module is configured to generate a first random index offset for the first BS module based on a first BS module identifier for the first BS module, access the first fast fading table based on the first random index offset to determine the first fast fading parameter, generate a second random index offset for the third BS module based on a second BS module identifier for the third BS module, access the first fast fading table based on the second random index offset to determine a second fast fading parameter, and generate the first interference metric based on the first resource allocation map, the second resource allocation map, the first fast fading parameter, and the second fast fading parameter.

Further aspects of the system comprise a third UE module connected to the wired network and associated with the second BS module. The second BS module is configured to send the first resource allocation map to the third UE module, the second UE module is configured to generate a first random index offset based on a first UE identifier for the second UE module and access the first fast fading table based on the first random index offset to determine the first fast fading parameter, and the third UE module is configured to generate a second random index offset based on a second UE identifier for the third UE module, access the first fast fading table based on the second random index offset to determine a second fast fading parameter, generate a second interference metric based on the first resource allocation map and the second fast fading parameter, and modulate a data transmission between the third UE module and the second BS module based on the second interference metric.

In a further aspect of the system, the data transmission comprises an uplink data transmission from the second UE module to the second BS module, the resource allocation map comprises a fast fading table identifier for the first UE module, and the second BS module is configured to access the first fast fading table from a library of fast fading tables based on the fast fading table identifier to determine the first fast fading parameter and generate the interference metric based on the first fast fading parameter.

In a further aspect of the system, at least one of the second UE module or the second BS module is configured to generate a random index offset based on a parameter having a first value responsive to the data transmission comprising a downlink data transmission and a second value responsive to the data transmission comprising an uplink data transmission and access the first fast fading table based on the random index offset to determine the first fast fading parameter.

In a further aspect of the system, at least one of the second UE module or the second BS module is configured to generate a randomized column index based on a speed associated with the second UE module and a predetermined speed associated with the first fast fading table and access the first fast fading table based on the randomized column index.

In a further aspect of the system, at least one of the second UE module or the second BS module is configured to generate a randomized column index based on a simulation frequency and a predetermined frequency associated with the first fast fading table and access the first fast fading table based on the randomized column index.

In a further aspect of the system, at least one of the second UE module or the second BS module is configured to generate a randomized column index based on a wrap-around count associated with the first fast fading table and access the first fast fading table based on the randomized column index.

In a further aspect of the system, the first fast fading table comprises a plurality of physical resource block entries having a predetermined sub-carrier spacing parameter, and at least one of the second UE module or the second BS module is configured to determine the first fast fading parameter based on the predetermined sub-carrier spacing and a sub-carrier spacing parameter associated with the second UE module.

Embodiments described herein also include a system comprising means for instantiating a first user equipment (UE) module, means for instantiating a second UE module, means for instantiating a first base station (BS) module associated with the first UE module, means for instantiating a second BS module associated with the second UE module, means for sending a first resource allocation map associated with the first UE module from the first BS module to the second BS module, means for accessing a first fast fading table to determine a first fast fading parameter for the second UE module, means for generating a first interference metric based on the first resource allocation map and the first fast fading parameter, and means for modulating a data transmission between the second UE module and the second BS module based on the first interference metric.

Embodiments described herein also include a method comprising instantiating a first user equipment (UE) module on a first computing device, instantiating a second UE module on a second computing device connected to the first computing device by a wired network, instantiating a first base station (BS) module associated with the first UE module on a third computing device coupled to the wired network, instantiating a second BS module associated with the second UE module on a fourth computing device coupled to the wired network, sending a first resource allocation map associated with the first UE module from the first BS module to the second BS module, accessing a first fast fading table to determine a first fast fading parameter for the second UE module, generating a first interference metric based on the first resource allocation map and the first fast fading parameter, and modulating a data transmission between the second UE module and the second BS module based on the first interference metric.

Further aspects of the method comprise sending the first resource allocation map from the second BS module to the second UE module, and generating the first interference metric by the second UE module based on the first fast fading parameter, wherein the data transmission comprises a downlink data transmission from the second BS module to the second UE module.

Further aspects of the method comprise instantiating a third UE module on a fifth computing device connected to the wired network, instantiating a third BS module associated with the third UE module on a sixth computing device connected to the wired network, sending by the third BS module a second resource allocation map to the second BS module, generating by the second BS module a first random index offset for the first BS module based on a first BS module identifier for the first BS module, accessing by the second BS module the first fast fading table based on the first random index offset to determine the first fast fading parameter, generating by the second BS module a second random index offset for the third BS module based on a second BS module identifier for the third BS module, accessing by the second BS module the first fast fading table based on the second random index offset to determine a second fast fading parameter, and generating by the second BS module the first interference metric based on the first resource allocation map, the second resource allocation map, the first fast fading parameter, and the second fast fading parameter.

Further aspects of the method comprise instantiating a third UE module associated with the second BS module on a fourth computing device connected to the wired network, sending by the second BS module the first resource allocation map to the third UE module, generating by the second BS module a first random index offset based on a first UE identifier for the second UE module, accessing by the second BS module the first fast fading table based on the first random index offset to determine the first fast fading parameter, generating by the third UE module a second random index offset based on a second UE identifier for the third UE module, accessing by the third UE module the first fast fading table based on the second random index offset to determine a second fast fading parameter, generating by the third UE module a second interference metric based on the first resource allocation map and the second fast fading parameter, and modulating by the third UE module a data transmission between the third UE module and the second BS module based on the second interference metric.

Further aspects of the method comprise accessing by the second BS module the first fast fading table from a library of fast fading tables based on a fast fading table identifier for the first UE module included in the resource allocation map to determine the first fast fading parameter and generating by the second BS module the interference metric based on the first fast fading parameter, wherein the data transmission comprises an uplink data transmission from the second UE module to the second BS module.

In a further aspect of the method, accessing first fast fading table, comprises generating a random index offset based on a parameter having a first value responsive to the data transmission comprising a downlink data transmission and a second value responsive to the data transmission comprising an uplink data transmission and accessing the first fast fading table based on the random index offset to determine the first fast fading parameter.

In a further aspect of the method, accessing the first fast fading table comprises generating a randomized column index based on a speed associated with the second UE module and a predetermined speed associated with the first fast fading table and accessing the first fast fading table based on the randomized column index.

In a further aspect of the method, accessing the first fast fading table comprises generating a randomized column index based on a simulation frequency and a predetermined frequency associated with the first fast fading table and accessing the first fast fading table based on the randomized column index.

In a further aspect of the method, accessing the first fast fading table comprises generating a randomized column index based on a wrap-around count associated with the first fast fading table and accessing the first fast fading table based on the randomized column index.

In a further aspect of the method, the first fast fading table comprises a plurality of physical resource block entries having a predetermined sub-carrier spacing parameter and accessing the first fast fading table comprises determining the first fast fading parameter based on the predetermined sub-carrier spacing and a sub-carrier spacing parameter associated with the second UE module.

Embodiments described herein also include a non-transitory computer-readable medium storing instructions thereon that when executed by a processor cause the processor to instantiate a first user equipment (UE) module on a first computing device, instantiate a second UE module on a second computing device connected to the first computing device by a wired network, instantiate a first base station (BS) module associated with the first UE module on a third computing device coupled to the wired network, instantiate a second BS module associated with the second UE module and on a fourth computing device coupled to the wired network, send a first resource allocation map associated with the first UE module from the first BS module to the second BS module, access a first fast fading table to determine a first fast fading parameter for the second UE module, generate a first interference metric based on the first resource allocation map and the first fast fading parameter, and modulate a data transmission between the second UE module and the second BS module based on the first interference metric.

Figure 1B:
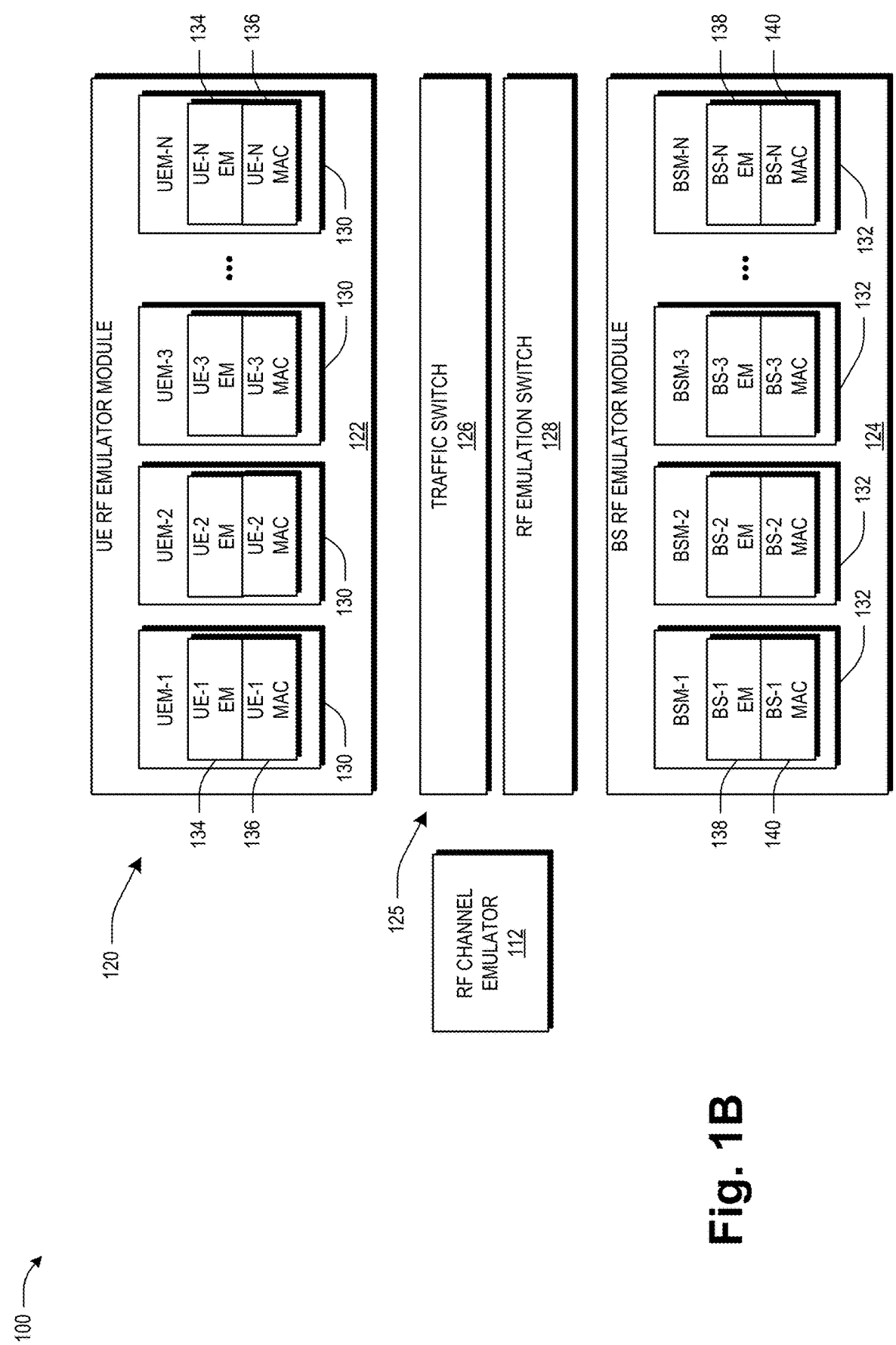
Figure 1C:
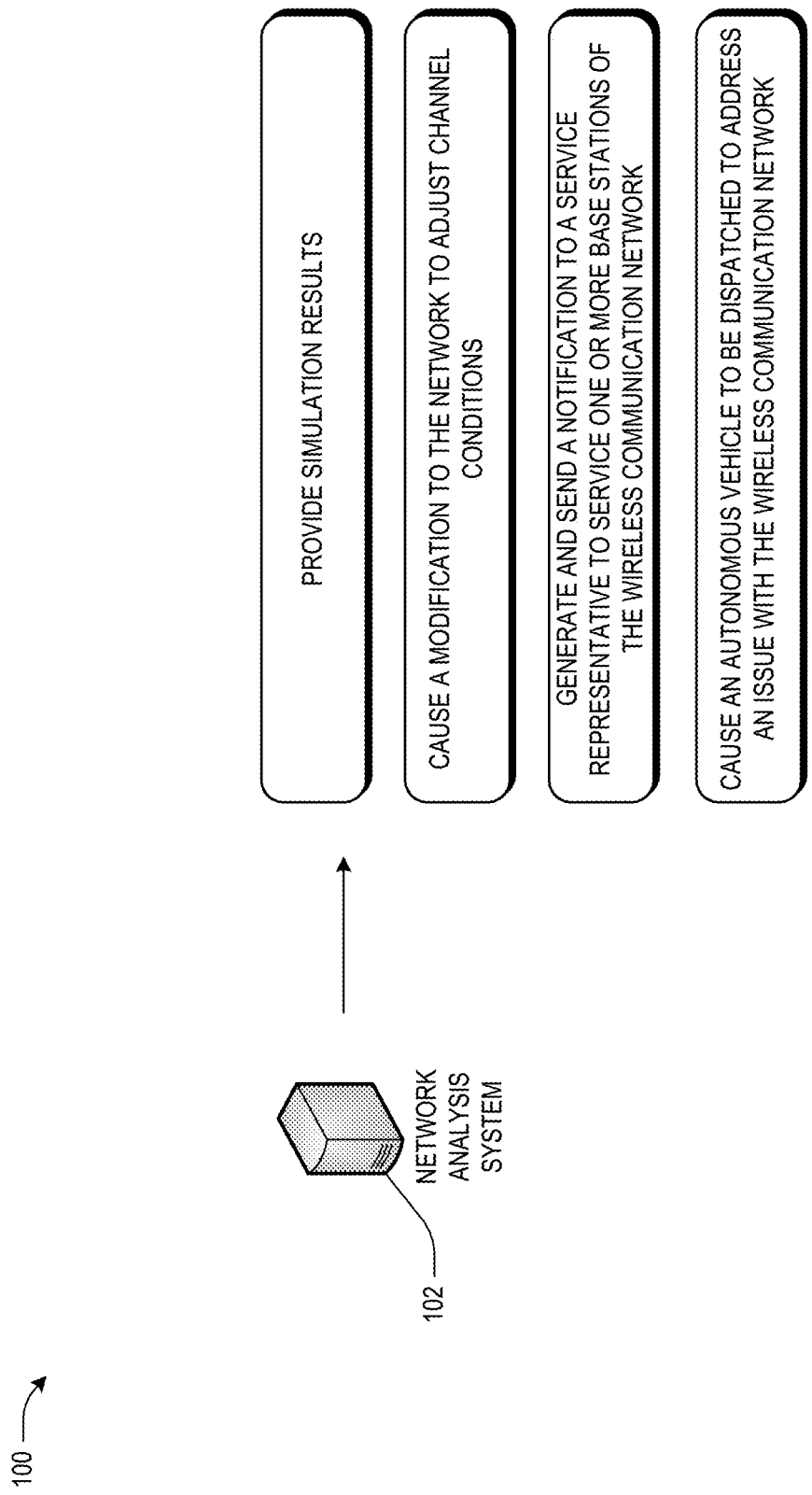

FIGS. 1A-1C are diagrams of one or more example implementations 100, according to some embodiments. Referring to FIGS. 1A-1C, a network analysis system 102 is utilized to generate and/or run a simulation 104 of a wireless telecommunications network 106, according to some embodiments. In some embodiments, the network analysis system 102 utilizes a result of the simulation to perform a diagnostic analysis on the wireless telecommunications network 106.

Referring to FIG. 1A, the network analysis system 102 receives simulation information. In some embodiments, the simulation information comprises information for generating a simulated environment corresponding to the wireless telecommunications network 106 and/or information for executing or running the simulation 104 of the wireless telecommunications network 106. In some implementations, the simulation information comprises control information, network information, base station information, UE information, and/or the like. In some embodiments, the control information comprises information associated with generating and/or running the simulation 104. For example, the control information may include information indicating a length of the simulation 104 (e.g., 1 hour, 1 day, 1 week, and/or the like), information indicating a weather condition associated with the simulation 104 (e.g., sunny, rainy, overcast, and/or the like), and/or other suitable control information.

In some embodiments, the network information comprises information indicating one or more characteristics of the wireless telecommunications network 106. For example, the network information may include information indicating a frequency band associated with the wireless telecommunications network 106 (e.g., a millimeter frequency band, a 5 GHz frequency band, and/or another frequency band), information indicating a geographical area associated with the wireless telecommunications network 106 (e.g., a coverage area associated with the wireless telecommunications network 106), information indicating key performance indicators associated with the wireless telecommunications network 106, and/or other suitable network information.

In some embodiments, the base station information comprises information associated with one or more base stations 108 (individually referenced as BS-1, BS-2, BS-3) included in the wireless telecommunications network. For example, the base station information may include information identifying a quantity of base stations 108 included in the wireless telecommunications network 106, information indicating a geographical location (e.g., a latitude, a longitude, and/or the like) of a base station 108, information indicating a frequency band associated with a base station 108, information indicating a configuration of a base station 108, information indicating a capacity of a base station 108, and/or other suitable base station information.

In some embodiments, the UE information comprises information associated with one or more UEs 110 (individually referenced as UE1-UE9) operating within the wireless telecommunications network 106. For example, the UE information may include UE location information, UE transmission information, UE characteristic information, and/or other suitable UE information.

In some embodiments, the UE location information comprises information indicating a location of a UE 110 and/or a path of travel of the UE 110 during the simulation 104. For example, the UE location information may include information indicating a geographical location at which the UE 110 is located, information indicating a time at which the UE 110 is located at the geographical location, information indicating a route the UE 110 is to travel along, information indicating a direction of travel associated with the UE 110, information indicating a speed associated with the UE 110 (e.g., a speed at which the UE 110 is traveling along the path of travel), and/or other suitable UE location information.

In some embodiments, the UE transmission information comprises information associated with data traffic transmitted to, or received by, the UE 110. For example, the UE transmission information may include information indicating a time and/or a location at which the data traffic is transmitted to, or received by, the UE 110, information indicating a type of data traffic (e.g., a request to establish a wireless communication session, a reference signal, an acknowledgement, and/or another suitable data traffic type) being transmitted or received.

In some embodiments, the UE characteristic information comprises information identifying one or more characteristics of the UE 110. For example, the UE characteristic information may include information indicating an identifier associated with the UE 110, information indicating a type of the UE 110 (e.g., a smart phone, a laptop, an autonomous vehicle, and/or other suitable UE type), information indicating a frequency band associated with the UE 110, information indicating a number of antennas associated with the UE 110, information indicating a transmission power associated with the UE 110, information identifying a fast fading table employed by the UE, and/or other suitable UE characteristic information.

In some implementations, the simulation information is received from another device, such as a device included in the wireless telecommunications network 106 or a device storing historical data associated with the wireless telecommunications network 106. For example, the network analysis system 102 may receive the simulation information from a base station 108 and/or a UE 110 included in the wireless telecommunications network 106. The base station 108 and/or the UE 110 may provide the simulation information to the network analysis system 102 periodically, based on receiving a request from the network analysis system 102, based on establishing a connection with the wireless telecommunications network 106, and/or based on other suitable criteria. In some embodiments, the network analysis system 102 receives the simulation information and stores the simulation information in a data structure (e.g., a database, a table, a list, and/or another suitable data structure).

In some implementations, a portion of simulation information is input by a user. A user may desire to run the simulation 104 of the wireless telecommunications network 106. The user may input the simulation information via a user interface provided by a client device associated with the network analysis system 102. In some embodiments, the network analysis system 102 receives the simulation information input by the user and stores the simulation information in the data structure.

In some embodiments, the network analysis system 102 comprises a RF channel emulator 112 to determine channel conditions associated with the simulation 104. In some embodiments, the RF channel emulator 112 is a module of the network analysis system 102 that inserts channel conditions into an uplink channel and/or a downlink channel during the simulation 104, as described below.

In some embodiments, the channel conditions include information indicating RF characteristics of data being transmitted between a UE 110 and a base station 108. In some embodiments, the channel conditions include information corresponding to information transmitted between a base station 108 and a UE 110 to enable the base station 108 and the UE 110 to determine channel conditions associated with transmitting data between the base station 108 and the UE 110. For example, the channel conditions may include information indicating a quality and/or a strength of a signal transmitted via an uplink channel (e.g., from a UE 110 to a base station 108) and/or information indicating a quality and/or a strength of a signal transmitted via a downlink channel (e.g., from a base station 108 to a UE 110) such as information indicating a reference signal received power (RSRP), information indicating a reference signal received quality (RSRQ), information indicating a signal to interference plus noise ratio (SINR), information indicating a received signal strength indicator (RSSI), and/or the like.

In some embodiments, the network analysis system 102 comprises a network mapping module 114 to determine a plurality of locations included within a geographical area associated with the wireless telecommunications network 106. The plurality of locations may correspond to locations of UEs 110 as the UEs 110 travel through the wireless telecommunications network 106. In some embodiments, the network analysis system 102 utilizes the plurality of locations to determine the channel conditions associated with the UEs 110, as described in greater detail below.

In some implementations, the network analysis system 102 determines the plurality of locations based on information input by a user. The user may input information identifying the plurality of locations and/or information for determining the plurality of locations (e.g., a quantity of the plurality of locations, a distance separating adjacent locations (e.g., 1 meter, 3 meters, 10 meters, and/or other suitable distances), and/or other suitable location information).

In some implementations, the simulation information comprises information identifying the plurality of locations and/or information for determining the plurality of locations. The network analysis system 102 determines the plurality of locations based on the simulation information.

In some embodiments, the network analysis system 102 determines channel conditions associated with the plurality of locations. In some embodiments, the network analysis system 102 determines an uplink channel condition and a downlink channel condition associated with data being transmitted between a UE 110, located at a particular location, and one or more base stations 108 associated with a coverage area that includes the particular location. The network analysis system 102 determines the uplink channel condition and the downlink channel condition for each of the plurality of locations. In some embodiments, the network analysis system 102 determines the channel conditions based on information input by a user, information obtained from a model associated with the wireless telecommunications network 106, historical data associated with the wireless telecommunications network 106, and/or the like. In some embodiments, the network analysis system 102 stores the channel conditions associated with the plurality of locations in a channel conditions data structure 116.

In some implementations, the network analysis system 102 employs multiple channel conditions data structures 116. Different channel conditions data structures 116 may be associated with various different characteristics of the wireless telecommunications network 106, such as a frequency associated with the wireless telecommunications network 106, a geographical characteristic (e.g., mountainous, flat, and/or other geographical characteristic), and/or some other characteristic).

As an example, a first channel conditions data structure 116 is associated with a first frequency spectrum (e.g., 2.5 GHz) and a second channel conditions data structure 116 is associated with a second frequency spectrum (e.g., 5 GHz). The first channel conditions data structure 116 stores information indicating channel conditions associated with data being transmitted between the UE 110 and a base station 108 from a location of the UE 110 via the first frequency spectrum. The second channel conditions data structure 116 stores information indicating channel conditions associated with data being transmitted between the UE 110 and the base station 108 from the location of the UE 110 via the second frequency spectrum.

Referring to FIG. 1B, the network analysis system 102 configures UE modules 130 and BS modules 132 for the simulation 104. In some embodiments, the UE modules 130 and the BS modules 132 are implemented in a physical layer emulation (PLE) 120 to simulate the effect of performing physical layer processes associated with uplink transmissions (e.g., coding, rate matching, scrambling, modulation, layer mapping, pre-coding transmission power, resource element mapping, beam forming port expansion, inverse fast Fourier transform (iFFT), cyclic prefix insertion, and/or other suitable uplink processes) and/or physical layer processes associated with downlink transmissions (e.g., cyclic prefix removal, fast Fourier transform (FFT), port reduction, resource element mapping, channel estimation, diversity combiner, equalization, inverse discrete Fourier transform (iDFT), demodulation, descrambling, rate matching, decoding, and/or other suitable downlink processes).

In some embodiments, the PLE 120 comprises the RF channel emulator 112, a UE RF emulator module 122 that instantiates UE modules 130 (individually references as UEM-1—UEM-N), a base station RF emulator module 124 that instantiates BS modules 132 (individually referenced as BSM-1—BSM-N), and a switch module 125 comprising a traffic switch 126, and an RF emulation switch 128.

In some embodiments, the UE modules 130 correspond to one or more UEs 110 operating within the wireless telecommunications network 106 being simulated. In some embodiments, a UE module 130 comprises the hardware of a UE 110 with the wireless portion of the hardware being emulated. The network analysis system 102 may determine the quantity of UEs 110 operating within the wireless telecommunications network 106 based on the simulation information. In some embodiments, the network analysis system 102 configures the UE RF emulator module 122 to control channel condition application for a predetermined number of UE modules 130, where the traffic of each UE 110 is independent of the other UEs 110. The quantity of UE modules 130 may be configured to emulate a performance of a quantity of UEs 110 operating within the wireless telecommunications network 106. Furthermore the UE RF emulator module 122 may drop packets from downlink transmissions based on the channel conditions obtained from the RF channel emulator 112.

In some implementations, the UE module 130 comprises a virtual machine instantiated on a computing device. The virtual machine may share the same physical resources (e.g., an Ethernet interface, a central processing unit (CPU), a memory, and/or the like) with other virtual machines corresponding to other UE modules 130. In some implementations, the UE RF emulator module 122 comprises a plurality of UE modules 130 instantiated on the same computing device. In some embodiments, the network analysis system 102 determines to instantiate the plurality of UE modules 130 on the same computing device based on a quantity of computing resources required to instantiate the plurality of UE modules 130, a quantity of the plurality of UE modules 130 failing to satisfy a threshold quantity, and/or other suitable criteria.

In some implementations, the plurality of UE modules 130 are instantiated on a plurality of computing devices. In some embodiments, the network analysis system 102 determines to instantiate the plurality of UE modules 130 on the plurality of computing devices based on the quantity of computing resources required to instantiate the plurality of UE modules 130, the quantity of the plurality of UE modules 130 satisfying the threshold quantity, and/or other suitable criteria.

In some embodiments, a UE module 130 comprises a UE emulator 134 (individually referenced as UE-1 EM—UE-N EM) and a UE medium access control (MAC) component 136 (individually referenced as UE-1 MAC—UE-N MAC). In some embodiments, the UE emulators 134 are configured to simulate the impact of the physical layer (PHY) and the air interface of the UE 110, e.g. taking into account propagation delay, the RF conditions, fading conditions based on the location of the UE relative to radio access network (RAN) elements and the like. In some embodiments, the network analysis system 102 configure the UE emulators 134 to transmit MAC transport data via an Ethernet network. The UE emulators 134 may use channel condition information associated with a location of the UE module 130 to cause the MAC transport data to simulate an RF signal transmitted by the UE 110 within the wireless telecommunications network. In some embodiments, the UE emulators 134 determine downlink interference metrics associated with transmissions between other UEs 110 and associated base stations 108 using the same PRBs.

In some embodiments, each UE MAC component 136 is configured to simulate a MAC layer of the UE 110. In some embodiments, the UE MAC component 136 determines RF characteristics associated with the MAC transport data based on the channel condition information. In some embodiments, the UE MAC component 136 extracts the channel condition information from data transmitted to the UE module 130 by the BS module 132. The UE MAC component 136 schedules data to be transmitted to the BS module 132 based on the channel conditions.

In some embodiments, the UE MAC component 135 comprises a hybrid automatic repeat request (HARQ) element, a multiplexing and de-multiplexing element, a logical channel prioritization element, a control element, and/or other suitable MAC elements. In some embodiments, the HARQ element simulates a transmit HARQ operation and/or a receive HARQ operation. The transmit HARQ operation includes transmission of transport blocks, reception and processing of HARQ acknowledgement signaling, and/or other suitable HARQ functions. In some embodiments, the receive HARQ operation includes the reception of transport blocks, the combining and decoding of the received transport blocks, and/or the generation of HARQ acknowledgement signaling.

The base station RF emulator module 124 may be configured to simulate a quantity of BS modules 132. In some embodiments, the network analysis system 102 determines a quantity of base stations 108 operating within the wireless telecommunications network 106 based on the simulation information. The network analysis system 102 may configure the base station RF emulator module 124 to include a corresponding quantity of BS modules 132. In some embodiments, the base station RF emulator module 124 may drop one or more packets received from the plurality of UEs 110 based on channel conditions associated with the plurality of UEs 110. In this embodiment, the channel conditions are shared with the base station RF emulator module 124 by the RF channel emulator 112.

In some implementations, the BS module 132 comprises a virtual machine instantiated on a computing device. The BS module 132 is configured to receive data transmitted by a UE module 130 via a physical layer abstraction implemented on a physical layer of the computing device. In some embodiments, the BS module 132 is configured to simulate the channel conditions associated with the received data based on the channel condition information inserted by the RF channel emulator 112.

In some implementations, the base station RF emulator module 124 comprises a plurality of BS modules 132 instantiated on the same computing device. The network analysis system 102 may determine to instantiate the plurality of BS modules 132 on the same computing device based on a quantity of computing resources required to instantiate the plurality of BS modules 132, a quantity of the plurality of BS modules 132 failing to satisfy a threshold quantity, and/or or other suitable criteria.

In some implementations, the plurality of BS modules 132 are instantiated on a plurality of computing devices. The network analysis system 102 may determine to instantiate the plurality of BS modules 132 on the plurality of computing devices based on the quantity of computing resources required to instantiate the plurality of BS modules 132, the quantity of the plurality of BS modules 132 satisfying the threshold quantity, and/or or other suitable criteria.

In some embodiments, the BS module 132 is configured to emulate a performance of a base station 108 operating within the wireless telecommunications network 106. In some embodiments, the BS module 132 comprises a BS emulator 138 (individually referenced as BS-1 EM—BS-N EM) and a BS MAC component 140 (Individually referenced as BS-1 MAC—BS-N MAC). In some embodiments, a BS emulator 138 is configured to simulate a physical layer of a base station 108. The BS emulator 138 receives channel conditions associated with a UE 110 inserted into uplink data transmitted by a UE module 130 corresponding to the UE 110 by the RF channel emulator 112. In some embodiments, the BS emulator 138 determines a quality of the uplink data based on the channel conditions. In some embodiments, the BS module 132 inserts corresponding downlink reference messages into downlink data transmitted to the UE module 130. The BS module 132 modulates the downlink data based on the channel conditions.

In some embodiments, the BS MAC component 140 is configured to determine an allocation of communication resources, such as PRBs, to the UE module 130 based on the channel conditions.

In some embodiments, the BS module 132 determines uplink interference metrics associated with transmissions between other base stations 108 and associated UEs 110 using the same PRBs.

In some embodiments, the network analysis system 102 determines one or more characteristics of the BS emulator 138 based on the simulation information. For example, the network analysis system 102 may determine a transmission frequency associated with the BS emulator 138, a quantity of antennas associated with the BS emulator 138, and/or other suitable base station parameters based on the base station information included in the simulation information. The network analysis system 102 configures the BS emulator 138 based on the one or more characteristics.

In some embodiments, the RF channel emulator 112 comprises a graphical user interface (GUI) and path planning module and a channel conditions lookup module. In some embodiments, the RF channel emulator 112 is configured to obtain channel condition information associated with transmitting data between a UE 110 and a base station 108 based on a location of the UE 110 and/or a location of the base station 108. In some embodiments, the network analysis system 102 configures the RF channel emulator 112 to insert information indicating an effect of the physical layer impairment (e.g., channel condition information) into MAC transport data transmitted between a BS module 132 and a UE module 130. For example, the network analysis system 102 may configure the RF channel emulator 112 to insert information indicating an uplink channel condition and/or information indicating a downlink channel condition into MAC transport data transmitted between the UE module and the base station module.

In some embodiments, the RF channel emulator 112 receives data transmitted between the BS module 132 and the UE module 130. In some embodiments, the RF channel emulator 112 applies a time stamp to the data. The time stamp may also be provided by a centralized service to the GUI and path planning module.

In some embodiments, the GUI and path planning module utilizes the time stamp to determine location information associated with the UE module 130 based on the simulation information. The simulation information may include information associating time stamps with locations of a UE 110 associated with the UE module 130. The GUI and path planning module determine the location of the UE 110 based on a pre-defined path. The location of the UE 110 is shared with the RF channel emulator 112. The RF channel emulator 112 then extracts the RF channel conditions for that particular UE 110 based on the relative location of the UE 110 to the various surrounding base stations. The RF channel emulator 112 may be configured to apply the channel conditions.

In some implementations, the RF channel emulator 112 may modify the one or more portions of the data by inserting noise, such as Gaussian noise, into the data. The RF channel emulator 112 may determine an amount of noise to be inserted into the data based on actual channel conditions associated with the location of the UE 110. For example, the channel condition information may include information identifying a signal-to-noise ratio associated with the location of the UE. The RF channel emulator 112 may determine the amount of noise to be inserted into the data based on the signal-to-noise ratio. The RF channel emulator 112 may insert the channel condition information into the data and may utilize the switch module 125 to provide the data to the UE module 130 and/or the BS module 132.

In some embodiments, the switch module 125 simulates processes associated with composing and decomposing MAC packet data units (PDUs), multiplexing data from multiple logical channels into a transport channel, de-multiplexing data from the transport channel into the multiple logical channels, and/or other suitable operations.

In some embodiments, the logical channel prioritization element of the UE MAC component 135 simulates processes for instructing the multiplexing and de-multiplexing element to generate MAC PDUs when radio resources for a new transmission are allocated, determining an amount of data from each logical channel that is to be included in each MAC PDU when radio resources for a new transmission are available, and/or other suitable operations. In some embodiments, the control element of UE MAC component 135 simulates processes associated with discontinuous reception (DRX) procedures, requesting resources, alignment of an uplink timing, power headroom reporting, and/or other suitable operations.

In some embodiments, the switch module 125 is a virtual switch coupled to the UE modules 130 on a first side and coupled to the BS modules 132 on a second side. In some embodiments, the switch module 125 is configured to time stamp and/or schedule data to simulate data transmitted on a shared channel via the wireless telecommunications network 106. In some embodiments, the switch module 125 is configured to receive an integrated data stream from the BS modules 132. The integrated data stream may include data for a plurality of UE modules 130. In some embodiments, the switch module 125 is configured to generate independent data streams for each simulated or physical UE 110 and provide the data to the particular UE 110 via the independent data stream. In some embodiments, the switch module 125 is configured to receive data from multiple UE modules 130. The switch module 125 aggregates the received data and transmits the aggregated data to the BS module 132.

In some implementations, the switch module 125 transmits data to the UE module 130 and the BS module 132 based on an IP address associated with the UE module 130. In some embodiments, the network analysis system 102 assigns an IP address to each BS module 132 and/or to each UE module 130. The switch module 125 transmits data between the BS module 132 and the UE module 130 based on the assigned IP addresses.

In some embodiments, the traffic switch 126 comprises a high speed Ethernet switch having a high speed interface (e.g., a 10 Gb/s or greater interface). In some embodiments, the network analysis system 102 configures the traffic switch 126 to process data transmitted via a user plane. In some embodiments, the RF emulator switch 128 comprises a low speed Ethernet switch having a low speed interface (e.g., a 1 Gb/s or lower interface). In some embodiments, the network analysis system 102 configures the RF emulator switch to process data transmitted via a control plane. Because an amount of data transmitted via the control plane may be small relative to an amount of data transmitted via the user plane, utilizing the low speed Ethernet switch may enable the network analysis system 102 to conserve computing resources and/or may reduce a cost associated with the network analysis system 102.

According to some embodiments, the network analysis system 102 generates and runs the simulation 104. In some embodiments, the network analysis system 102 employs the RF channel emulator 112, the UE RF emulator module 122, the base station RF emulator module 124, and/or the switch module 125 to execute or run the simulation 104 of a wireless communication session according to the channel conditions. The network analysis system 102 may generate and/or run the simulation 104 as described in greater detail below with respect to FIGS. 2, 3, and 4.

As shown in FIG. 10, the network analysis system 102 performs one or more actions based on running the simulation 104. In some implementations, the one or more actions include providing simulation results. For example, the network analysis system 102 may perform a diagnostic analysis of the wireless telecommunications network 106 based on running the simulation 104. The diagnostic analysis may determine how a planned modification to the wireless telecommunications network 106 affects a performance of the wireless telecommunications network 106. The network analysis system 102 may provide a result of the diagnostic analysis for display on a device associated with a network operator. In this way, the network analysis system 102 may enable a user (e.g., the network operator) to quickly and efficiently determine how a planned modification may affect the performance of the wireless telecommunications network 106.

In some implementations, the one or more actions include causing a modification to the wireless telecommunications network 106 to adjust channel conditions. The network analysis system 102 may determine that a performance characteristic of a wireless communication session associated with a virtual base station and a virtual user equipment does not satisfy a threshold based on running the simulation 104. The network analysis system 102 may cause a modification to a base station 108 corresponding to the virtual base station and/or to the wireless telecommunications network 106 to improve channel conditions associated with the base station 108 based on determining that the channel characteristic does not satisfy the threshold. In this way, the network analysis system 102 may automatically modify the wireless telecommunications network 106 to improve the performance of the wireless telecommunications network 106. By automatically modifying the wireless telecommunications network 106, the network analysis system 102 may conserve computing resources, human resources, and/or the like that may have otherwise been utilized to cause a modification to the wireless telecommunications network 106 to adjust channel conditions.

In some implementations, the one or more actions include generating and sending a notification to a service representative to service one or more of the base stations 108 of the wireless telecommunications network 106 and/or causing an autonomous vehicle to be dispatched to address an issue with the wireless telecommunications network 106. The network analysis system 102 may determine that a performance characteristic of a wireless communication session associated with a virtual base station and a virtual user equipment does not satisfy a threshold based on running the simulation 104. The network analysis system 102 may generate and/or send a notification to a service representative to service a base station 108 corresponding to the virtual base station and/or cause an autonomous vehicle to be dispatched to address an issue with the base station 108 based on the performance characteristic not satisfying the threshold.

FIG. 10 is a diagram of an example implementation 100, according to some embodiments. As shown in FIG. 10, the switch module 125 may enable data to be transmitted between the BS module 132 and the UE module 130 via an uplink channel 150 and a downlink channel 152 according to channel conditions from the channel conditions data structure 116 determined by the RF channel emulator 112. In some embodiments, the BS module 132 simulates an antenna of a base station 108 included in the wireless telecommunications network 106 and transmits downlink data (e.g., a reference signal) to the switch module 125 via the downlink channel 152.

In some embodiments, the switch module 125 is configured to handle communications of a wireless communication session. In some implementations, the switch module 125 forwards unicast messages generated based on a broadcast message received from a BS module 132. For example, the switch module 125 may receive a broadcast message from a BS module 132. The broadcast message may include information associated with a set of UE modules 130. In some embodiments, the RF channel emulator 112 analyze the broadcast messages and determines the set of UE modules associated with the broadcast message. The RF channel emulator 112 may convert the broadcast message into a plurality of unicast messages associated with the set of UE modules. The RF channel emulator 112 may provide the plurality of unicast messages to the switch module 125. The switch module 125 may forward the plurality of unicast messages to the set of UE modules. In this way, the RF channel emulator 112 and the switch module 125 may reduce an amount of data transmitted between the BS module 132 and the UE modules thereby conserving computing resources that otherwise would have been utilized to transmit the broadcast message to a UE module that is not associated with the broadcast message.

In some implementations, the switch module 125 provides consolidated data to a UE module 130 and/or a BS module 132. For example, the switch module 125 may receive a broadcast message associated with a set of UE modules 130 and a first unicast message associated with a UE module 130 included in the set of UE modules 130. The RF channel emulator 112 may convert the broadcast message into a plurality of unicast messages associated with the set of UE modules 130. The RF channel emulator 112 may determine that a second unicast message, of the plurality of unicast messages, is associated with the UE module 130. The RF channel emulator 112 may generate consolidate the first unicast message and the second unicast message to generate consolidated data based on the first unicast message and the second unicast message being associated with the UE module 130. The RF channel emulator 112 may provide the consolidated data to the switch module 125 and the switch module 125 may transmit the consolidated data to the UE module 130. In this manner, the RF channel emulator 112 and the switch module 125 may conserve computing resources that otherwise would have been utilized to transmit two separate unicast messages to the UE module 130.

Prior to the switch module 125 forwarding the downlink data to a UE module 130, the RF channel emulator 112 may obtain channel conditions from the channel conditions data structure 116 associated with the downlink data based on a location of the UE 110 emulated by the UE module 130 relative to the base station 108 emulated by the BS module 132. The RF channel emulator 112 provides the channel conditions to the UE module 130 and the BS module 132 for application to uplink and/or downlink transmissions.

In some embodiments, the switch module 125 analyzes the downlink data to determine an IP address associated with the UE module 130 to which the downlink data is to be transmitted. For example, the switch module 125 may analyze the downlink data to determine an identifier associated with the UE module 130. The switch module 125 may access a data structure storing information associating identifiers with IP addresses to determine an IP address associated with the identifier. The switch module 125 may provide the downlink data to the UE module 130 based on the IP address.

In some embodiments, the UE emulator 134 of the UE module 130 receives the downlink data and/or the information from the channel conditions data structure 116 indicating the channel conditions. In some embodiments, the UE emulator 134 extracts the information identifying the channel conditions from the downlink channel and applies the channel conditions to the downlink data. The UE emulator 134 provides the downlink data to the UE MAC component 136 based on applying the channel conditions.

In some embodiments, the UE MAC component 136 schedules uplink data to be transmitted to the BS module 132 and may determine a modulation scheme (e.g., bipolar phase keying (BPSK), quadrature phase shift keying (QPSK), amplitude shift keying (ASK), frequency shift keying (FSK), and/or another suitable scheme) associated with transmitting data to the BS module 132 based on the channel conditions applied to the downlink data. In some embodiments, the UE emulator 134 transmits uplink data to the BS module 132 via the switch module 125 based on the schedule and/or the modulation scheme determined by the UE MAC component 136.

The switch module 125 receives the uplink data. In some embodiments, prior to the switch module 125 forwarding the uplink data to the BS module 132, the RF channel emulator 112 accesses the channel conditions data structure 116 to determine channel conditions associated with the uplink data based on a location of the UE 110 emulated by the UE module 130 relative to the base station 108 emulated by the BS module 132. The RF channel emulator 112 applies the channel conditions to the uplink data and/or may provide information indicating the channel conditions to the UE module 130 and the BS module 132.

In some embodiments, the switch module 125 analyzes the uplink data to determine an IP address associated with the BS module 132 to which the uplink data is to be transmitted. For example, the switch module 125 may analyze the uplink data to determine an identifier associated with the BS module 132. The switch module 125 may access a data structure storing information associating identifiers with IP addresses to determine an IP address associated with the identifier. The switch module 125 may provide the uplink data to the BS module 132 based on the IP address.

In some embodiments, the BS emulator 138 receives the uplink data via the uplink channel. The BS MAC component 140 extracts channel condition information from the uplink data. The BS MAC component 140 determines channel conditions associated with the uplink channel based on the channel conditions. In some embodiments, the BS MAC component 140 allocates resources, such as PRBs, to the UE module 130 based on the channel conditions associated with the uplink channel. The BS MAC component 140 provides information identifying the allocated resources to the BS emulator 138. The BS emulator 138 transmits downlink data to the UE module 130. The downlink data includes information indicating the resources allocated to the UE module 130 to enable the UE module 130 to utilize the allocated resources to communicate via the wireless telecommunications network.

As indicated above, FIGS. 1A-1E are provided as one or more examples. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
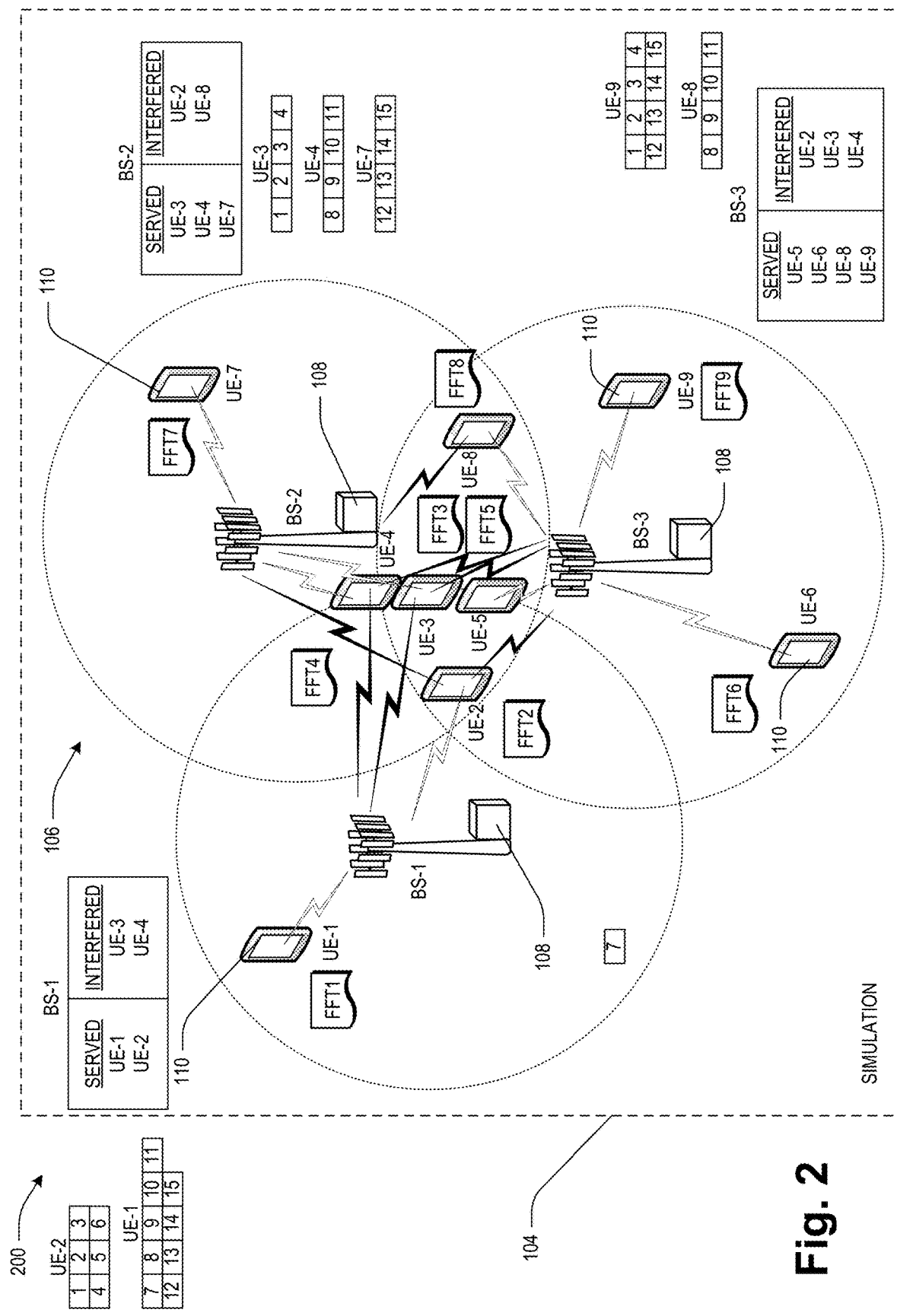
FIGS. 2 and 3, are diagrams of an example implementations illustrating downlink communications and uplink communications, respectively, according to some embodiments.
Figure 3:
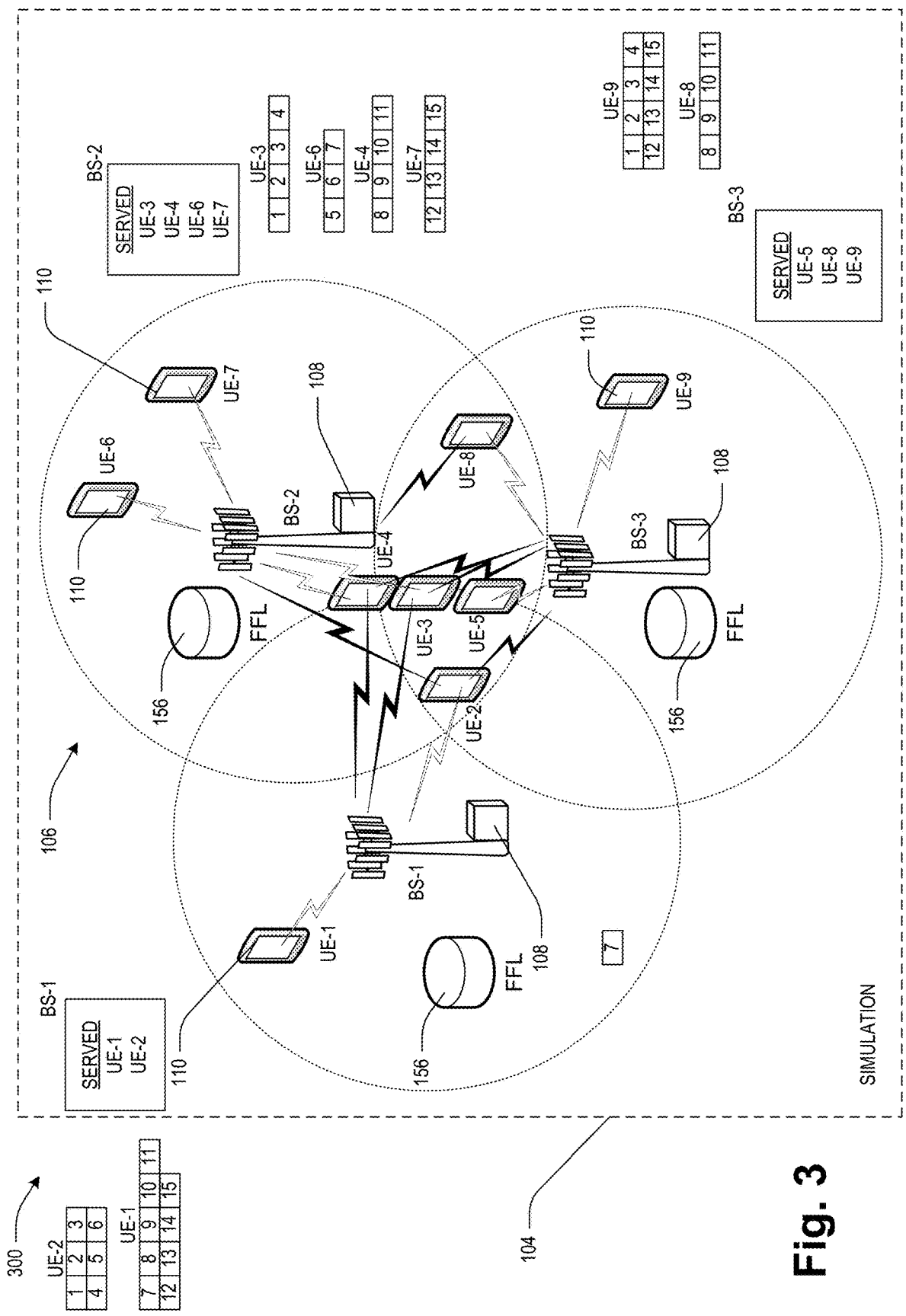

Referring to FIGS. 2 and 3, diagrams of an example implementations 200, 300 illustrating downlink communications and uplink communications, respectively, in the wireless telecommunications network 106 are provided, according to some embodiments. Interference from other UEs 110 or base stations 108 affects the channel conditions seen by a particular UE 110 or base station 108. In some embodiments, the UE module 130 calculates a SINR parameter for downlink communications and the BS module 132 calculates a SINR parameter for uplink communication.

For the downlink scenario in the implementation 200 of FIG. 2, each UE module 130 is aware of its serving base station 108. Each UE module 130 is aware of the neighboring cells and their associated base stations 108 that have overlapping coverage areas with its serving base station 108. A UE module 130 need not be aware of the locations of nearby UEs 110. A UE module 130 determines a downlink interference metric based on the neighboring base stations 108 that are transmitting using one or more of the PRBs that it has been assigned by its serving base station 108. Each base station 108 is aware of the UEs 110 it serves and assigns PRBs to the assigned UEs 110 for TTIs. The base station 108 is not aware of non-served UEs 110 that are interfered with by its transmissions. Each base station 108 communicates its assigned PRBs using a DCI message to its served UEs 110. Each BS module 132 generates a DL-RAM message that includes the DCI information for its base station 108 to facilitate sharing PRB assignments with neighboring BS modules 132.

In the example of FIG. 2, BS-1 serves UE-1 and UE-2, BS-2 serves UE-3, UE-4, and UE-7, and BS-3 serves UE-5, UE-6, UE-8, and UE-9, as indicated by the communication links filled with white. Interference is possible when a first base station 108 assigns PRBs to a first UE 110 that overlap PRBs assigned to a second UE 110 served by a second base station 108, and the first UE 110 is within the coverage area of the second base station 108. The UEs 110 served by a base station 108 and the potential interfering base stations 108 may vary over time UEs 110 change location. The example of FIG. 2 is associated with a single TTI at a given time, k.

As seen in FIG. 2, UE-1 is not susceptible to interference from BS-2 or BS-3. UE-2 is susceptible to interference from BS-2 and/or BS-3. UE-3 and UE-4 are susceptible to interference from BS-1 and/or BS-3. UE-5 is susceptible to interference from BS-1 and/or BS-2. UE-6 is not susceptible to interference from BS-1 or BS-3. UE-7 is not susceptible to interference from BS-1 or BS-2. UE-8 is susceptible to interference from BS-1 and/or BS-2. UE-9 is not susceptible to interference from BS-1 or BS-3.

FIG. 2 illustrates downlink PRB assignments for a particular TTI. In some embodiments, the base station 108 sends a DCI message to its served UEs 110 indicating the assigned PRBs. Note that not all UEs 110 are assigned PRBs in the particular TTI illustrated in FIG. 2. According to the assigned PRBs illustrated in FIG. 2, solid black communication links represent interference from non-serving base stations 108. For example, BS-1 assigns PRBs 1-6 to UE-2, and BS-2 assigns PRBs 1-4 to UE-3, giving rise to interference from BS-2 for UE-2 and interference from BS-1 for UE-3. BS-2 assigns PRBs 8-11 to UE-4, and BS-3 assigns PRBs 8-11 to UE-8, giving rise to interference from BS-3 for UE-4 and interference from BS-2 for UE-8. BS-1 assigns PRBs 1-6 to UE-2, and BS-3 assigns PRBs 1-4 to UE-9, giving rise to interference from BS-3 for UE-2. Since UE-9 is not within the coverage area of BS-1, interference is not generated from BS-1 for UE-9.

FIG. 2 illustrates downlink PRB assignments for a particular TTI. In some embodiments, the base station 108 sends a DCI message to its served UEs 110 indicating the assigned PRBs. Note that not all UEs 110 are assigned PRBs in the particular TTI illustrated in FIG. 2. According to the assigned PRBs illustrated in FIG. 2, solid black communication links represent interference from non-serving base stations 108. For example, BS-1 assigns PRBs 1-6 to UE-2, and BS-2 assigns PRBs 1-4 to UE-3, giving rise to interference from BS-2 for UE-2 and interference from BS-1 for UE-3. BS-2 assigns PRBs 8-11 to UE-4, and BS-3 assigns PRBs 8-11 to UE-8, giving rise to interference from BS-3 for UE-4 and interference from BS-2 for UE-8. BS-1 assigns PRBs 1-6 to UE-2, and BS-3 assigns PRBs 1-4 to UE-9, giving rise to interference from BS-3 for UE-2. Since UE-9 is not within the coverage area of BS-1, interference is not generated from BS-1 for UE-9.

To facilitate computation of interference noise metrics, PRB assignments are exchanged between BS modules 132 and UE modules 130. Each base station 108 sends a DCI message to each of its served UEs 110 that assigns PRBs for one or more future TTIs. Based on the DCI information, each BS module 132 BS module 132 generates a DL-RAM message that lists the PRBs allocated for its served UEs 110. In some embodiments, the DL-RAM message comprises a bitmap in which PRBs are indexed in the order of increasing frequency starting with the lowest frequency employed in the carrier bandwidth spectrum. In some embodiments, the PRBs are mapped from the most significant bit (MSB) to the least significant bit (LSB). Unassigned or unused PRBs are set to "0" and assigned PRBs are set to "1". In some embodiments, the DL-RAM does not identify the served UE 110, but rather, only the assigned status of the PRBs used by the base station 108 for the TTI. In some embodiments, the DL-RAM messages exchanged between BS modules 132 include a cell ID field and a PRB bitmap field.

Each BS module 132 combines the DL-RAM messages received from neighboring BS module 132 to generate a combined DL-RAM message to send to the UE modules 130 of its served UEs 110 for the given TTI. In some embodiments, a BS module 132 only sends the combined DL-RAM message to the UE modules 130 of UEs 110 that are assigned PRBs for the given TTI, thereby reducing message overhead in the network analysis system 102. For example, the BS module 132 for BS-1 sends a combined DL-RAM message for BS-2 and BS-3 to the UE modules 130 for UE-1 and UE-2, the BS module 132 for BS-2 sends a combined DL-RAM message for BS-1 and BS-3 to the UE modules 130 for UE-3, UE-4, and UE-7, and the BS module 132 for BS-3 sends a combined DL-RAM message for BS-1 and BS-2 to the UE modules 130 for UE-8 and UE-9.

In some embodiments, the BS modules 132 identify UEs 110 that are not subject to interference and do not send the combined DL-RAM messages. For example, the BS module 132 for BS-1 identifies that UE-1 is not susceptible to interference based on the received DL-RAM messages and does not send the combined DL-RAM message to the UE modules 130 for UE-1. This approach further reduces overhead traffic.

In some embodiments, the combined DL-RAM message comprises a first field specifying a number of neighboring base stations 108 ranging from 0 to a maximum number of neighboring base stations, and for each neighboring base station 108, the base station ID field and the PRB bitmap field.

Upon receiving the DL-RAM messages, the UE module 130 calculates an interference metric for the TTI. In some embodiments, the interference metric comprises an SINR metric calculated by dividing the signal power from the serving base station 108 by the interference power associated with interfering base stations 108. The Interference power, $P_I$, is calculated using the equation:

$$P_I^{RBi}[mW] = \sum\nolimits^{BSj} \left\{ \gamma_{RBi}^{BSj}[lin] * P_{Tx}^{BSj,RBi}[mW] * 10^{\left(G_{e2e}^{BSj}/10\right)} \right\}$$

where $BS_j$ indicates a neighboring base station 108, $\gamma$ is a fast fading parameter, $P_{Tx}$ indicates the transmit power of the neighboring base station 108, and $(G_{e2e}^{BSj}$ is the end-to-end gain for the path between the UE 110 and the neighboring base station 108. The end-to-end gain may include a cable loss, a feeder loss, an over the air path loss, building penetration losses for indoor UEs, antenna gain of the base station 108, antenna gain of the UE 110, or other suitable gain or loss parameters. In some embodiments, the end-to-end gain is based on the simulated locations of the base stations 108 and the UE 110 and is retrieved from the channel conditions data structure 116. Prior to the switch module 125 forwarding the downlink data to a UE module 130, the RF channel emulator 112 may obtain channel conditions associated with the downlink data based on a location of the UE 110 emulated by the UE module 130 relative to the base station 108 emulated by the BS module 132. The RF channel emulator 112 provides the channel conditions to the UE module 130 and the BS module 132 for application to uplink and/or downlink transmissions.

Figure 1D:
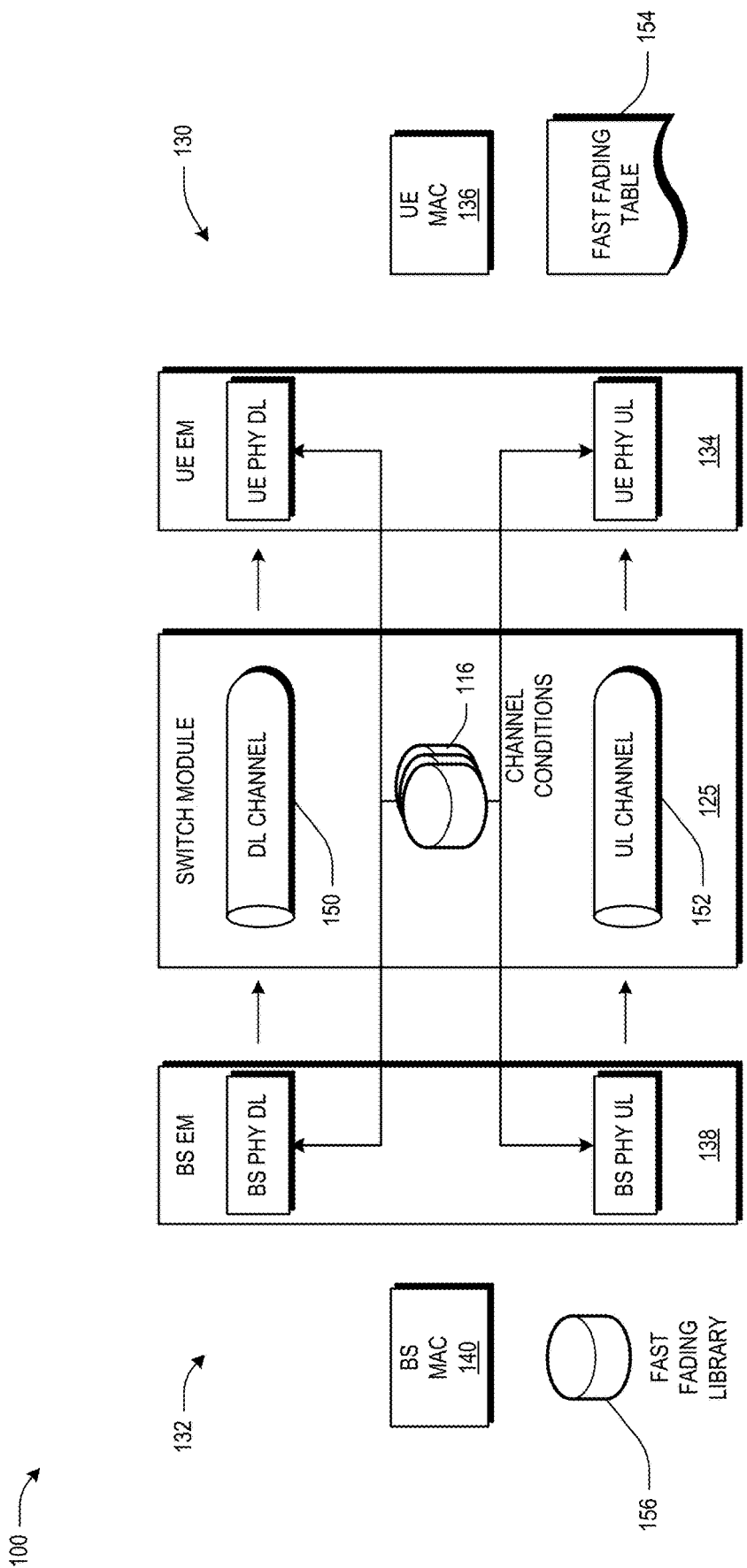

Referring to FIG. 1D, in some embodiments, the UE module 130 employs a fast fading table 154 to determine the fast fading parameter, $\gamma$. In some embodiments, a fast fading table library 156 stores a plurality of fast fading tables 154, such as for different UE types, different channel models, etc. The fast fading table library 156 may be a global library that may be called, for example by the UE module 130 or the BS module 132, using a table identifier. In some embodiments, the fast fading table 154 is provided to the UE module 130 during the simulation setup, as illustrated in FIG. 2 by FFT1-FFT9. The fast fading parameters, $\gamma$, may be real or complex values. Each fast fading table in the fast fading table library 156 includes a list of table parameters, such as FF Table ID, FF Table Speed, $v_{i_0}$, time difference between entries, $\Delta t$, a FF table frequency, $f_c$, a FF Table sub-carrier spacing (SCS), and a FF Table Dimension Parameter, N.

Referring to FIG. 1E, a diagram illustrating the fast fading table 154 is provided, according to some embodiments. The fast fading table comprises a time dimension represented by columns and a frequency dimension represented by rows. In some embodiments, the each column represents a sample time for the simulation, and each row represents a particular PRB. The values in the fast fading table 154 are generated using a channel model assuming a predetermined speed, $v_{i_0}$, a predetermined simulation frequency, $f_c$, and a predetermined sub-carrier spacing (SCS) in the frequency domain for the PRBs.

According to some embodiments, the UE module 130 uses a pseudo random number to generate a random index offset in the fast fading table 154 at time t0:

$C_{UE_i}^t = \text{MOD}(\text{PRN}(\text{ID}_{UE_i} + Q*\text{ID}_{BS_j} + \text{User Defined Seed} + \text{UL\_offset}, N)$, where $\text{ID}_{UE_i}$ is a unique identifier for the UE 110, $\text{ID}_{BS_j}$ is a unique identifier for a base station 108, Q is a constant, such as 10,000, used to increase separation between consecutive UEs 110, the User Defined Seed is a global parameter used by all UEs 110 and base stations 108, the UL_offset is an optional parameter that allows a different starting point for UL and DL transmissions, and N is the number of columns in the fast fading table 154. For DL transmissions, the UL_offset may be zero. Note that since the unique identifier for the UE 110 is employed in generating the random index offset, each UE 110 using the same fast fading table 154 will employ a different random index offset. Since the unique identifier for the base station 108 is employed in generating the random index offset, the UE 110 will employ a different random index offset for each base station 108. Since the random index offset is a function of the base station identifier and the UE identifier, the UE module 130 and the BS module 132 may independently determine the same index without the need to exchange and information other than the identifier for the fast fading table 154 employed. This arrangement also allows the UE module 130 to transition to a different serving BS module 132 while maintaining the same fast fading profile.

At a given time in the simulation, the UE module 130 determines a fast fading parameter for each of the PRBs it employs for DL communication for use in the interference power equation and for each of the interfering base stations 108. Each UE 110 has an associated list that specifies a UE identifier field, a fast fading table identifier field, a UE default speed parameter, a UE operating frequency parameter, and a UE SCS parameter. As the simulation progresses, the UE module 130 indexes the column used for the fast fading parameter in the next time interval.

The absolute column index, T, for the next time sample, $t_{k+1}$, given a time difference, $\Delta t$, between columns in the fast fading table 154 is:

$$T = \left\lfloor \frac{(t_{k+1})}{\Delta t} \right\rfloor.$$

The randomized column index, P, is generated by adding the absolute column index to the random index offset:

$$P = T + C_{UE_i}^{L_i}(t_0).$$

Since the fast fading table 154 includes a finite number of entries, the fast fading table 154 will be wrapped around one or more times as the simulation progresses. The number of wrap-arounds is:

$$R = \left\lfloor \frac{(t_{k+1})}{\Delta t * N} \right\rfloor.$$

If the randomized column index, P, is greater than the number of columns, N, the random index offset is adjusted based on the number of wrap-arounds such that the same series of fast fading parameters is not used after each wrap-around:

$$C_{UE_i}^{L_i}(t_{k+1}) = (P+R) \bmod N.$$

In some embodiments, the simulation parameters, such as the UE speed, $v_i$, and the simulation frequency, $f_c'$, (i.e., representing the time interval between simulation time slots) differs from the predetermined speed, $v_{i_0}$, and/or simulation frequency, $f_c$, used to generate the fast fading table 154. The index for the next interval may be adjusted by:

$$P' = \left\lfloor T * \frac{f_c'}{f_c} * \frac{v_i}{v_{i_0}} \right\rfloor + C_{UE_i}^{L_i}(t_k).$$

In some embodiments, the UE module 130 applies the interference parameter to the received downlink transmission to simulate the effects of interfering base stations 108 on the signal it receives from its serving base station 108.

In some embodiments, the $SCS_s$ for the simulation differs from the $SCS_d$ assumed for generating the fast fading table 154 and the PRB index used for accessing the fast fading table 154 may be adjusted accordingly. In the context of the 3GPP 5G NR standard only certain discrete values of the SCS are allowed: SCS=15, 30, 60, or 120 kHz (the synchronization signal (SS) allows SCS=240 kHz).

In a situation where $SCS_s \geq SCS_d$ the PRB index is adjusted by:

$$PRBidx' = PRBidx * \frac{SCS_s}{SCS_d},$$

where PRBidx is the PRB in the simulation and PRBidx' is the value used to index the fast fading table 154.

In a situation where $SCS_s < SCS_d$, interpolation may be needed. If mod(RBidx, SCSd/SCSs)=0 no interpolation is needed and the PRB index is adjusted by:

$$PRBidx' = PRBidx * \frac{SCS_s}{SCS_d}.$$

If mod(RBidx, SCSd/SCSs)≠0 interpolation is needed, and linear interpolation is used:

$$PRBidx1' = PRBidx * \frac{SCS_s}{SCS_d}.$$

$$PRBidx2' = PRBidx1' - 1,$$

RBidx1' and RBidx2' are the index values of the rows in the fading table for the interpolation. An example linear interpolation that may be used with real valued fast fading parameters is:

$\gamma' = \gamma(PRBidx1',C(t)) + (\text{mod } (PRBidx, SCS_d/SCS_s/SCS_d/SCS_s)) * (\gamma(PRBidx2',C(t)) - \gamma(PRBidx1',C(t)))$, where $\gamma(PRBidx1',C(t))$ is the fading value for row PRBidx1' and column C(t), $\gamma(PRBidx2',C(t))$ is the fading value for row PRBidx2' and column C(t), and $\gamma'$ is the fading value to be used for PRBidx at time t.

For the uplink scenario in the implementation 300 of FIG. 3, BS-1 serves UE-1 and UE-2, BS-2 serves UE-3, UE-4, UE-6, and UE-7, and BS-3 serves UE-5, UE-8, and UE-9, as indicated by the communication links filled with white. Interference is possible when a first base station 108 assigns PRBs to a first UE 110 that overlap PRBs assigned to a second UE 110 served by a second base station 108, and the first UE 110 is within the coverage area of the second base station 108. The UEs 110 served by a base station 108 and the potential interfering base stations 108 may vary over time UEs 110 change location. The example of FIG. 3 is associated with a single TTI at a given time, k.

As seen in FIG. 3, BS-1 is susceptible to interference from transmissions by UE-3, UE-4, and UE-5. BS-2 is susceptible to interference from transmissions by UE-2, UE-5 and UE-8. BS-3 is susceptible to interference from transmissions by UE-2-, UE-3, and UE-4.

FIG. 3 illustrates uplink PRB assignments for a particular TTI. In some embodiments, the base station 108 sends an uplink control information (UCI) message to its served UEs 110 indicating the assigned PRBs. Note that not all UEs 110 are assigned PRBs in the particular TTI illustrated in FIG. 3. According to the assigned PRBs illustrated in FIG. 3, solid black communication links represent interference from non-served UEs 110. For example, BS-1 assigns uplink PRBs 1-6 to UE-2, and BS-2 assigns uplink PRBs 1-5 to UE-3, giving rise to interference from UE-2 for BS-2 and interference from UE-3 for BS-1. BS-2 assigns PRBs 8-11 to UE-4, and BS-3 assigns PRBs 8-11 to UE-8, giving rise to interference from UE-4 for BS-3 and interference from UE-8 for BS-2. BS-1 assigns PRBs 1-6 to UE-2, and BS-3 assigns PRBs 1-4 to UE-9, giving rise to interference from UE-2 for BS-3. Since UE-9 is not within the coverage area of BS-1, interference is not generated for BS-1 by UE-9.

To facilitate computation of interference noise metrics, PRB assignments are exchanged between BS modules 132 and UE modules 130. Each base station 108 sends a UCI message to each of its served UEs 110 that assigns PRBs for one or more future TTIs. Based on the UCI information, each BS module 132 BS module 132 generates a UL-UERAM message that lists the uplink PRBs allocated for each of its served UEs 110. In some embodiments, the UL-UERAM message comprises a first field indicating the number of scheduled UEs 110 and data for each UE 110. In some embodiments, the UE data comprises a UE identifier field, a fast fading table identifier field, a UE default speed parameter, a PRB bitmap, a base station count field indicating the number of base stations 108 in which the UE 110 has coverage, and for each base station, the UE data comprises a base station identifier field and a path loss parameter indicating the path loss between the UE 110 and the base station 108. In some embodiments, the BS module 132 retrieves the path loss parameters for each UE and the base stations 108 from the channel conditions data structure 116. Each BS module 132 sends the UL-UERAM message to neighboring BS modules 132. This approach reduces overhead traffic by combining UE data for all served UE 110 into a single UL_UERAM message for sharing by the base stations 108.

Upon receiving the UL-UERAM messages from its neighboring BS modules 132, the BS module 132 calculates an uplink interference metric for the TTI. In some embodiments, the uplink interference metric comprises. an SINR metric for each served UE 110 generated by dividing the signal power from the served UE 110 by the interference power associated with interfering UE 110. The Interference power, $P_I$, is calculated using the equation:

$$P_I[mW] = \sum\nolimits^{UEj}\left(\sum\nolimits^{RB}\gamma_{RBi}^{BSd,UEj}[lin] * P_{Tx}^{UEj,RBi}[lin]\right) * 10^{\left(G_{e2e}^{BSd,UEj}/10\right)}$$

where $BS_j$ indicates a neighboring base station 108, $UE_j$ indicates neighboring UE 110, $\gamma_{RBi}^{BSd,UEj}$ is the fast fading parameter, $P_{Tx}$ indicates the transmit power of the UE 110, ($G_{e2e}^{BSd,UEj}$ indicates the end-to-end gain. In some embodiments, the losses and gains not included in the UL-UERAM message are retrieved from the channel conditions data structure 116.

At a given time in the simulation, the BS module 132 determines a fast fading parameter for each of the served and interfering UEs 110 for use in the interference power equation. The BS module 132 accesses the fast fading table library 156, as illustrated in FIG. 3, based on the fast fading table identifier field specified for each UE 110 in the UL-UERAM messages. The BS module 132 calculates the random index offset for each served and interfering UE 110 as described above.

As the simulation progresses, the BS module 132 indexes the column used for the fast fading parameter in the next time interval. The BS module 132 calculates the wrap-around parameter, speed corrections, frequency corrections, and SCS corrections as described for the DL fast fading calculation. The BS module 132 calculates the new index for each of the served and interfering UEs 110 and access the fast fading table library 156 specified by the fast fading table identifier field specified for each UE 110 based on the updated index. Since the random index is based on identifiers for the UE module 130 and the base station module 132, and the UE module 130 identifies the fast fading table 154 it uses, any BS module 132 can access the fast fading table library 156 and recreate the random index and offsets used by any UE module 130 without communication between the BS module 132 and the UE module 130.

In some embodiments, the BS module 132 applies the interference metric to the received uplink transmission to simulate the effects of interfering UE 110 on the signal it receives from its served UE 110.

Figure 4:
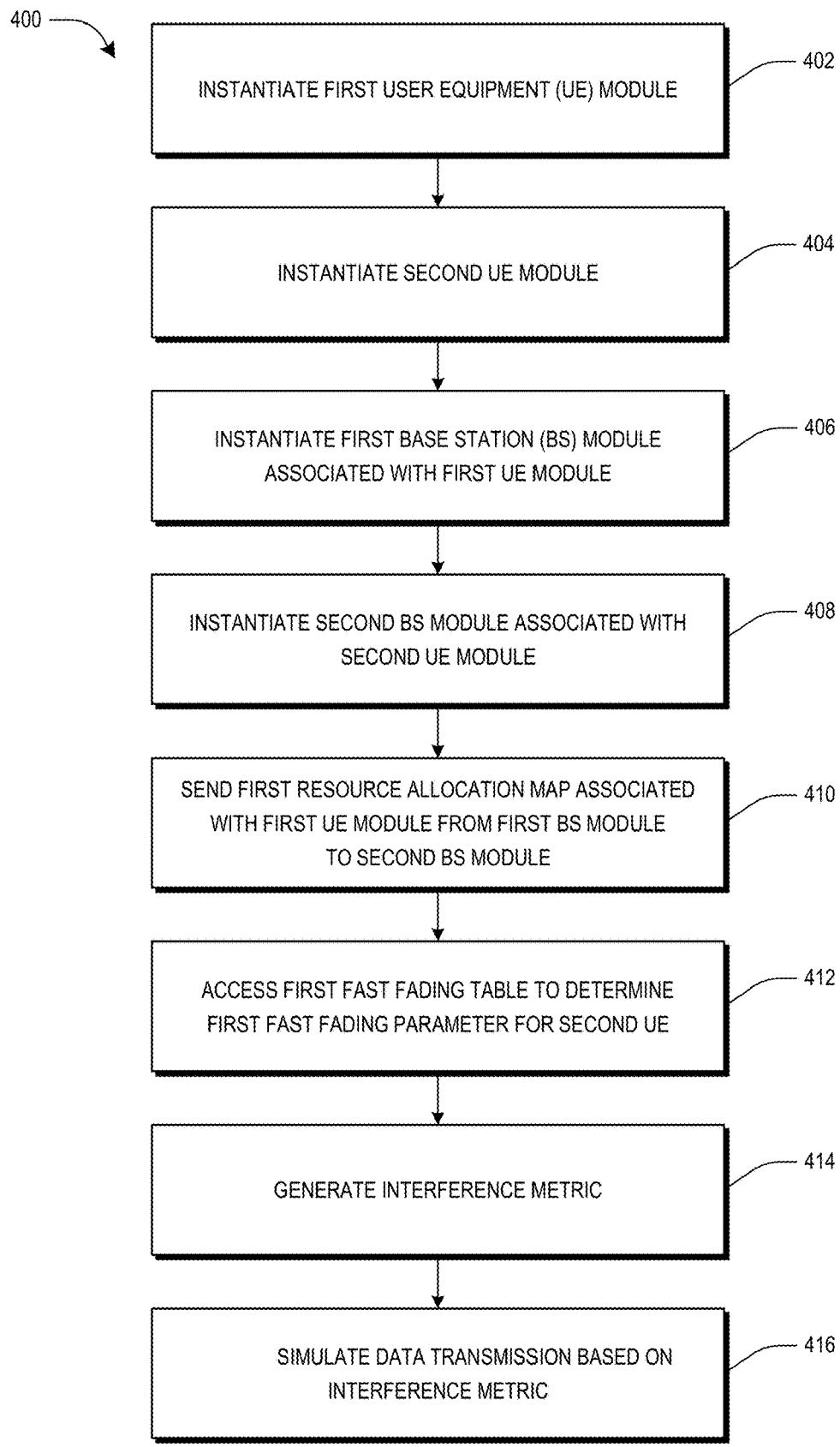
FIG. 4 is a flow chart illustrating an example method for estimating interference in a wireless telecommunication network, according to some embodiments.

FIG. 4 is a flow chart illustrating an example method 400 for estimating interference in a wireless telecommunication network 106, according to some embodiments. At 402 A first user equipment (UE) module 130 is instantiated. The first UE module 130 may be instantiated on a first computing device. At 404, a second UE module 130 is instantiated. The second UE module 130 may be instantiated on a second computing device connected to the first computing device by a wired network. At 406, a first base station (BS) module 132 associated with the first UE module 130 is instantiated. The first BS module 132 may be instantiated on a third computing device coupled to the wired network. At 408, a second BS module 132 associated with the second UE module 130 is instantiated. The second BS module 132 may be instantiated on a fourth computing device coupled to the wired network. At 410 a first resource allocation map associated with the first UE module 130 is sent from the first BS module 132 to the second BS module 132. At 412, a first fast fading table 154 is accessed to determine a first fast fading parameter for the second UE module 130. At 414, an interference metric is generated. The interference metric may be generated based on the first resource allocation map and the first fast fading parameter. At 416, a data transmission between the second UE module 130 and the second BS module 132 is simulated based on the interference metric.

Figure 5:
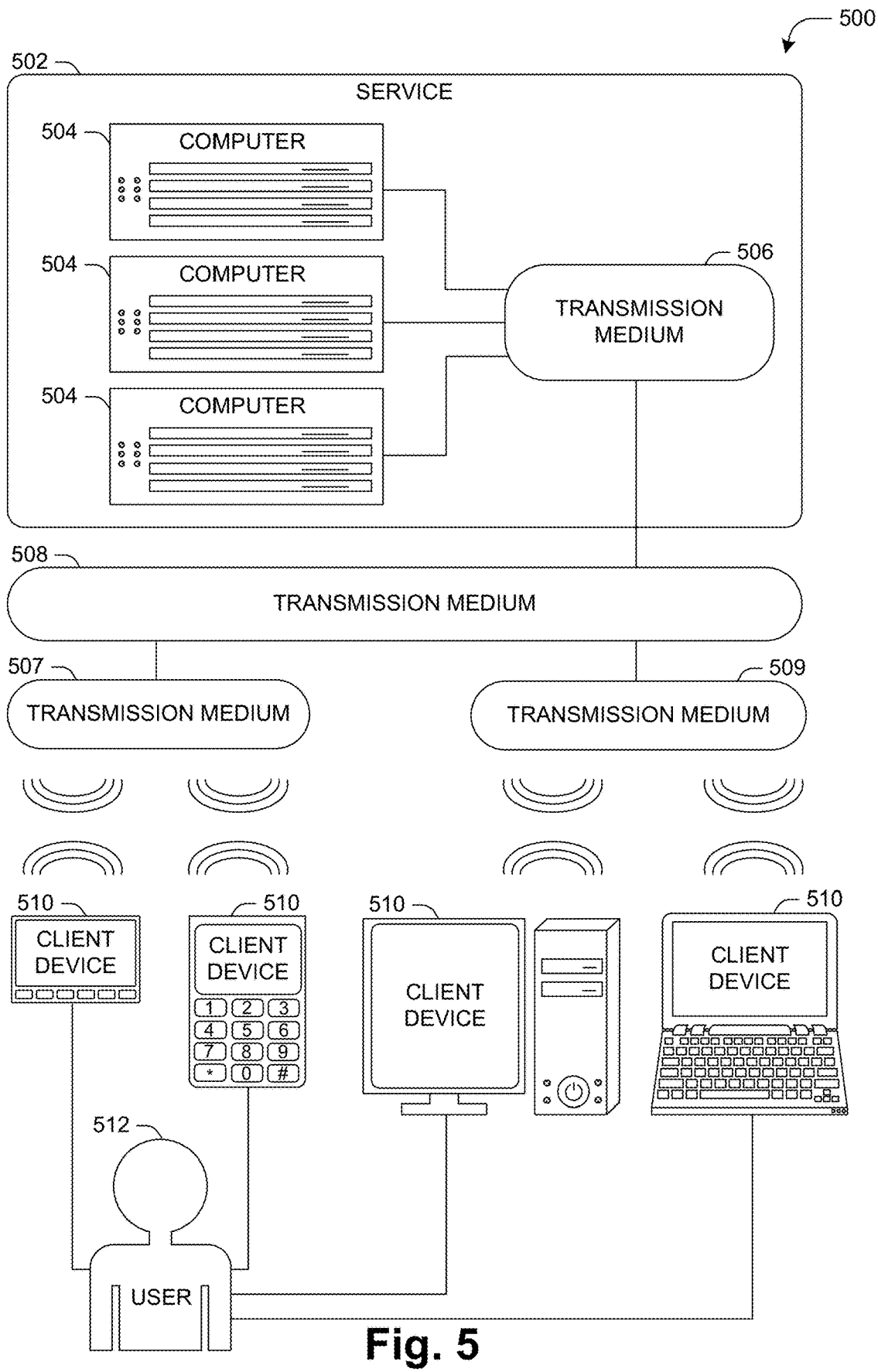
FIG. 5 is an illustration of a scenario involving various examples of transmission mediums that may be used to communicatively couple computers and clients.

In some implementations, one or more process blocks of FIG. 4 may be performed by a device (e.g., network analysis system 102). In some implementations, one or more process blocks of FIG. 4 may be performed by another device or a group of devices separate from or including the device, such as a user equipment and/or the like. FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figure 6:
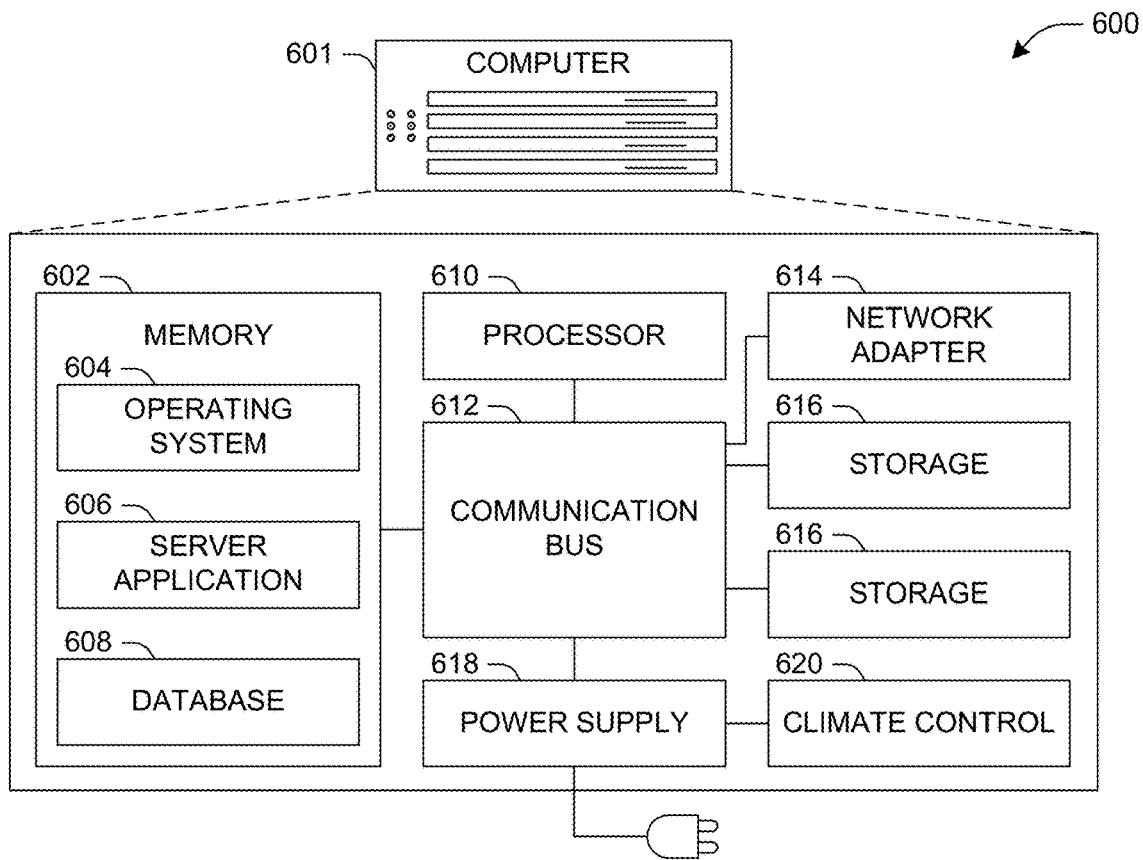
FIG. 6 is an illustration of a scenario involving an example configuration of a computer that may utilize and/or implement at least a portion of the techniques presented herein.

FIG. 6 presents a schematic architecture diagram 600 of a computer 601 such as the computer 504 in FIG. 5, that may utilize at least a portion of the techniques provided herein. Such a computer 601 may vary widely in configuration or capabilities, alone or in conjunction with other computers, in order to provide a service.

The computer 601 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 601 may comprise memory 602 storing various forms of applications, such as an operating system 604; one or more computer applications 606; and/or various forms of data, such as a database 608 or a file system. The computer 601 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 601 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 601 with at least one other computer. Other components that may optionally be included with the computer 601 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 601 to a state of readiness.

The computer 601 may operate in various physical enclosures, such as a desktop or tower, and/or may be integrated with a display as an "all-in-one" device. The computer 601 may be mounted horizontally and/or in a cabinet or rack, and/or may simply comprise an interconnected set of components. The computer 601 may comprise a dedicated and/or shared power supply 618 that supplies and/or regulates power for the other components. The computer 601 may provide power to and/or receive power from another computer and/or other devices. The computer 601 may comprise a shared and/or dedicated climate control unit 620 that regulates climate properties, such as temperature, humidity, and/or airflow. Many such computers 601 may be configured and/or adapted to utilize at least a portion of the techniques presented herein.

Figure 7:
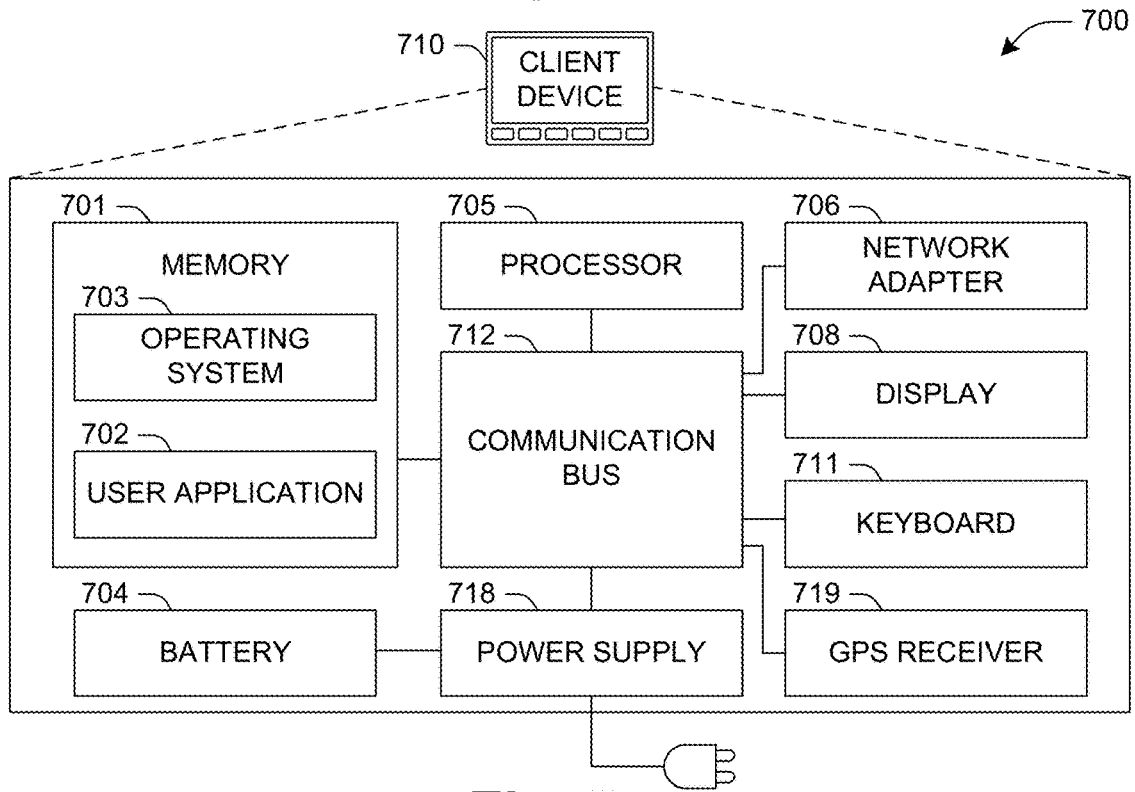
FIG. 7 is an illustration of a scenario involving an example configuration of a client that may utilize and/or implement at least a portion of the techniques presented herein.

FIG. 7 presents a schematic architecture diagram 700 of a client device 710, such as the client device 510 in FIG. 5, whereupon at least a portion of the techniques presented herein may be implemented. Such a client device 710 may vary widely in configuration or capabilities, in order to provide a variety of functionality to a user such as the user 512. The client device 710 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 705 that process instructions. The one or more processors 705 may optionally include a plurality of cores; one or more coprocessors, such as a mathematics coprocessor or an integrated graphical processing unit (GPU); and/or one or more layers of local cache memory. The client device 710 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 712 that interconnect the processor 705, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 718 that supplies and/or regulates power for other components, and/or a battery 704 that stores power for use while the client device 710 is not connected to a power source via the power supply 718. The client device 710 may provide power to and/or receive power from other client devices.

Figure 8:
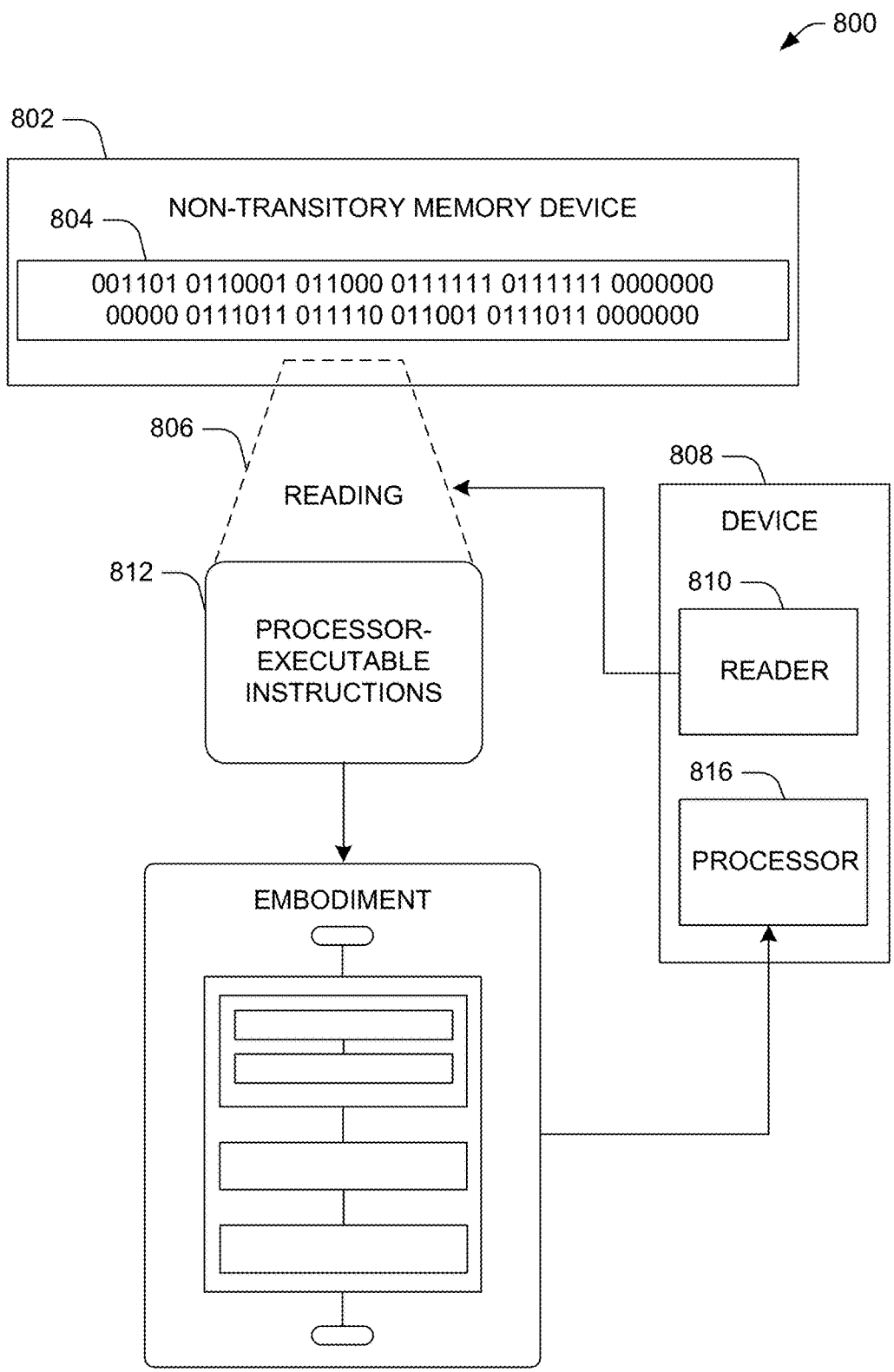
FIG. 8 is an illustration of a scenario featuring an example non-transitory machine readable medium in accordance with one or more of the provisions set forth herein.

FIG. 8 is an illustration of a scenario 800 involving an example non-transitory machine-readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 802 stores machine-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
a first user equipment (UE) module and a second UE module connected to a wired network;
a first base station (BS) module associated with the first UE module and coupled to the wired network; and
a second BS module associated with the second UE module and coupled to the wired network, wherein:
the first BS module is configured to send a first resource allocation map associated with the first UE module to the second BS module; and
at least one of the second UE module or the second BS module is configured to:
access a first fast fading table to determine a first fast fading parameter for the second UE module,
generate a first interference metric based on the first resource allocation map and the first fast fading parameter, and
modulate a data transmission between the second UE module and the second BS module based on the first interference metric.

2. The system of claim 1, wherein:
the data transmission comprises a downlink data transmission from the second BS module to the second UE module;
the second BS module is configured to send the first resource allocation map to the second UE module; and
the second UE module is configured to generate the first interference metric based on the first fast fading parameter.

3. The system of claim 2, comprising:
a third UE module connected to the wired network; and
a third BS module associated with the third UE module and connected to the wired network, wherein:
the third BS module is configured to send a second resource allocation map to the second BS module, and
the second UE module is configured to:
generate a first random index offset for the first BS module based on a first BS module identifier for the first BS module,
access the first fast fading table based on the first random index offset to determine the first fast fading parameter,
generate a second random index offset for the third BS module based on a second BS module identifier for the third BS module,
access the first fast fading table based on the second random index offset to determine a second fast fading parameter, and
generate the first interference metric based on the first resource allocation map, the second resource allocation map, the first fast fading parameter, and the second fast fading parameter.

4. The system of claim 2, comprising:
a third UE module connected to the wired network and associated with the second BS module, wherein:
the second BS module is configured to send the first resource allocation map to the third UE module;
the second UE module is configured to generate a first random index offset based on a first UE identifier for the second UE module and access the first fast fading table based on the first random index offset to determine the first fast fading parameter, and
the third UE module is configured to generate a second random index offset based on a second UE identifier for the third UE module, access the first fast fading table based on the second random index offset to determine a second fast fading parameter, generate a second interference metric based on the first resource allocation map and the second fast fading parameter, and modulate a data transmission between the third UE module and the second BS module based on the second interference metric.

5. The system of claim 1, wherein:
the data transmission comprises an uplink data transmission from the second UE module to the second BS module,
the first resource allocation map comprises a fast fading table identifier for the first UE module, and
the second BS module is configured to access the first fast fading table from a library of fast fading tables based on the fast fading table identifier to determine the first fast fading parameter and generate the first interference metric based on the first fast fading parameter.

6. The system of claim 1, wherein:
at least one of the second UE module or the second BS module is configured to generate a random index offset based on a parameter having a first value responsive to the data transmission comprising a downlink data transmission and a second value responsive to the data transmission comprising an uplink data transmission and access the first fast fading table based on the random index offset to determine the first fast fading parameter.

7. The system of claim 1, wherein:
at least one of the second UE module or the second BS module is configured to generate a randomized column index based on a speed associated with the second UE module and a predetermined speed associated with the first fast fading table and access the first fast fading table based on the randomized column index.

8. The system of claim 1, wherein:
at least one of the second UE module or the second BS module is configured to generate a randomized column index based on a simulation frequency and a predetermined frequency associated with the first fast fading table and access the first fast fading table based on the randomized column index.

9. The system of claim 1, wherein:
at least one of the second UE module or the second BS module is configured to generate a randomized column index based on a wrap-around count associated with the first fast fading table and access the first fast fading table based on the randomized column index.

10. The system of claim 1, wherein:
the first fast fading table comprises a plurality of physical resource block entries having a predetermined sub-carrier spacing parameter, and
at least one of the second UE module or the second BS module is configured to determine the first fast fading parameter based on the predetermined sub-carrier spacing parameter and a sub-carrier spacing parameter associated with the second UE module.

11. A method comprising:
instantiating a first user equipment (UE) module on a first computing device;
instantiating a second UE module on a second computing device connected to the first computing device by a wired network;
instantiating a first base station (BS) module associated with the first UE module on a third computing device coupled to the wired network;
instantiating a second BS module associated with the second UE module on a fourth computing device coupled to the wired network;
sending a first resource allocation map associated with the first UE module from the first BS module to the second BS module;
accessing a first fast fading table to determine a first fast fading parameter for the second UE module;
generating a first interference metric based on the first resource allocation map and the first fast fading parameter; and
modulating a data transmission between the second UE module and the second BS module based on the first interference metric.

12. The method of claim 11, comprising:
sending the first resource allocation map from the second BS module to the second UE module; and
generating the first interference metric by the second UE module based on the first fast fading parameter, wherein:
the data transmission comprises a downlink data transmission from the second BS module to the second UE module.

13. The method of claim 12, comprising:
instantiating a third UE module on a fifth computing device connected to the wired network;
instantiating a third BS module associated with the third UE module on a sixth computing device connected to the wired network;
sending by the third BS module a second resource allocation map to the second BS module;
generating by the second BS module a first random index offset for the first BS module based on a first BS module identifier for the first BS module;
accessing by the second BS module the first fast fading table based on the first random index offset to determine the first fast fading parameter;
generating by the second BS module a second random index offset for the third BS module based on a second BS module identifier for the third BS module;
accessing by the second BS module the first fast fading table based on the second random index offset to determine a second fast fading parameter; and
generating by the second BS module the first interference metric based on the first resource allocation map, the second resource allocation map, the first fast fading parameter, and the second fast fading parameter.

14. The method of claim 12, comprising:
instantiating a third UE module associated with the second BS module on the fourth computing device connected to the wired network;
sending by the second BS module the first resource allocation map to the third UE module;
generating by the second BS module a first random index offset based on a first UE identifier for the second UE module;
accessing by the second BS module the first fast fading table based on the first random index offset to determine the first fast fading parameter;
generating by the third UE module a second random index offset based on a second UE identifier for the third UE module;
accessing by the third UE module the first fast fading table based on the second random index offset to determine a second fast fading parameter;
generating by the third UE module a second interference metric based on the first resource allocation map and the second fast fading parameter; and
modulating by the third UE module a data transmission between the third UE module and the second BS module based on the second interference metric.

15. The method of claim 11, comprising:
accessing by the second BS module the first fast fading table from a library of fast fading tables based on a fast fading table identifier for the first UE module included in the first resource allocation map to determine the first fast fading parameter; and
generating by the second BS module the first interference metric based on the first fast fading parameter, wherein:
the data transmission comprises an uplink data transmission from the second UE module to the second BS module.

16. The method of claim 11, wherein accessing the first fast fading table, comprises:
generating a random index offset based on a parameter having a first value responsive to the data transmission comprising a downlink data transmission and a second value responsive to the data transmission comprising an uplink data transmission; and
accessing the first fast fading table based on the random index offset to determine the first fast fading parameter.

17. The method of claim 11, wherein accessing the first fast fading table comprises:
generating a randomized column index based on a speed associated with the second UE module and a predetermined speed associated with the first fast fading table; and
accessing the first fast fading table based on the randomized column index.

18. The method of claim 11, wherein accessing the first fast fading table comprises:
generating a randomized column index based on a simulation frequency and a predetermined frequency associated with the first fast fading table; and
accessing the first fast fading table based on the randomized column index.

19. The method of claim 11, wherein accessing the first fast fading table comprises:
generating a randomized column index based on a wrap-around count associated with the first fast fading table; and
accessing the first fast fading table based on the randomized column index.

20. The method of claim 11, wherein:
the first fast fading table comprises a plurality of physical resource block entries having a predetermined sub-carrier spacing parameter, and
accessing the first fast fading table comprises determining the first fast fading parameter based on the predetermined sub-carrier spacing parameter and a sub-carrier spacing parameter associated with the second UE module.

21. A non-transitory computer-readable medium, storing instructions thereon that when executed by a processor cause the processor to:
- instantiate a first user equipment (UE) module on a first computing device;
- instantiate a second UE module on a second computing device connected to the first computing device by a wired network;
- instantiate a first base station (BS) module associated with the first UE module on a third computing device coupled to the wired network;
- instantiate a second BS module associated with the second UE module and on a fourth computing device coupled to the wired network;
- send a first resource allocation map associated with the first UE module from the first BS module to the second BS module;
- access a first fast fading table to determine a first fast fading parameter for the second UE module;
- generate a first interference metric based on the first resource allocation map and the first fast fading parameter; and
- modulate a data transmission between the second UE module and the second BS module based on the first interference metric.

* * * * *